United States Patent
Sauer

(10) Patent No.: US 11,653,175 B2
(45) Date of Patent: *May 16, 2023

(54) APPARATUSES, SYSTEMS, AND METHODS FOR DETERMINING LOCATION OF A MOBILE DEVICE(S) IN A DISTRIBUTED ANTENNA SYSTEM(S)

(71) Applicant: Corning Optical Communications LLC, Charlotte, NC (US)

(72) Inventor: Michael Sauer, Corning, NY (US)

(73) Assignee: Corning Optical Communications LLC, Charlotte, NC (US)

(*) Notice: Subject to any disclaimer, the term of this patent is extended or adjusted under 35 U.S.C. 154(b) by 122 days.

This patent is subject to a terminal disclaimer.

(21) Appl. No.: 17/195,934

(22) Filed: Mar. 9, 2021

(65) Prior Publication Data

US 2021/0195370 A1 Jun. 24, 2021

Related U.S. Application Data

(63) Continuation of application No. 16/539,927, filed on Aug. 13, 2019, now Pat. No. 10,959,047, which is a
(Continued)

(51) Int. Cl.
*H04W 4/02* (2018.01)
*H04B 7/0413* (2017.01)
(Continued)

(52) U.S. Cl.
CPC .......... *H04W 4/023* (2013.01); *H04B 7/0413* (2013.01); *H04B 17/318* (2015.01);
(Continued)

(58) Field of Classification Search
None
See application file for complete search history.

(56) References Cited

U.S. PATENT DOCUMENTS 2,628,312 A 2/1953 Olaf et al.
3,848,254 A 11/1974 Drebinger et al.
(Continued)

FOREIGN PATENT DOCUMENTS

AU 2010100320 A4 6/2010
CN 1222007 A 7/1999
(Continued)

OTHER PUBLICATIONS

"Cellular Specialties Introduces the First Simulcasted In-building Location-Based Tracking Solution," http://smart-grid.tmcnet.com/news/2009/09/14/4368300.htm, 2 pages.
(Continued)

*Primary Examiner* — Hong S Cho
(74) *Attorney, Agent, or Firm* — William D. Doyle

(57) ABSTRACT

Distributed antenna systems provide location information for client devices communicating with remote antenna units. The location information can be used to determine the location of the client devices relative to the remote antenna unit(s) with which the client devices are communicating. A location processing unit (LPU) includes a control system configured to receive uplink radio frequency (RF) signals communicated by client devices and determines the signal strengths of the uplink RF signals. The control system also determines which antenna unit is receiving uplink RF signals from the device having the greatest signal strength.

16 Claims, 27 Drawing Sheets

Related U.S. Application Data continuation of application No. 15/876,754, filed on Jan. 22, 2018, now Pat. No. 10,448,205, which is a continuation of application No. 15/356,723, filed on Nov. 21, 2016, now Pat. No. 9,913,094, which is a continuation of application No. 14/873,483, filed on Oct. 2, 2015, now Pat. No. 9,532,329, which is a continuation of application No. 14/034,948, filed on Sep. 24, 2013, now Pat. No. 9,185,674, which is a continuation of application No. 13/365,843, filed on Feb. 3, 2012, now Pat. No. 8,570,914, which is a continuation of application No. PCT/US2010/044884, filed on Aug. 9, 2010.

(51) Int. Cl.
*H04B 17/318* (2015.01)
*H04W 88/08* (2009.01)
*H04W 64/00* (2009.01)
*H04W 4/021* (2018.01)
*H04W 4/33* (2018.01)
*H04W 56/00* (2009.01)
*H04W 4/40* (2018.01)
*H04W 4/60* (2018.01)
*H04W 16/20* (2009.01)
*H04B 10/2575* (2013.01)

(52) U.S. Cl.
CPC ............ *H04W 4/021* (2013.01); *H04W 4/33* (2018.02); *H04W 4/40* (2018.02); *H04W 4/60* (2018.02); *H04W 56/0015* (2013.01); *H04W 64/00* (2013.01); *H04W 88/085* (2013.01); *H04B 10/25752* (2013.01); *H04W 16/20* (2013.01)

(56) References Cited

U.S. PATENT DOCUMENTS

| | | |
|---|---|---|
| 3,986,182 A | 10/1976 | Hackett |
| 4,167,738 A | 9/1979 | Kirkendall |
| 4,449,246 A | 5/1984 | Seiler et al. |
| 4,573,212 A | 2/1986 | Lipsky |
| 4,665,560 A | 5/1987 | Lange |
| 4,899,285 A | 2/1990 | Nakayama et al. |
| 4,935,746 A | 6/1990 | Wells |
| 4,939,852 A | 7/1990 | Brenner |
| 4,972,346 A | 11/1990 | Kawano et al. |
| 5,056,109 A | 10/1991 | Gilhousen et al. |
| 5,059,927 A | 10/1991 | Cohen |
| 5,187,803 A | 2/1993 | Sohner et al. |
| 5,206,655 A | 4/1993 | Caille et al. |
| 5,208,812 A | 5/1993 | Dudek et al. |
| 5,257,407 A | 10/1993 | Heinzelmann |
| 5,278,989 A | 1/1994 | Burke et al. |
| 5,280,472 A | 1/1994 | Gilhousen et al. |
| 5,339,259 A | 8/1994 | Puma et al. |
| 5,381,459 A | 1/1995 | Lappington |
| 5,396,224 A | 3/1995 | Dukes et al. |
| 5,420,863 A | 5/1995 | Taketsugu et al. |
| 5,513,176 A | 4/1996 | Dean et al. |
| 5,519,830 A | 5/1996 | Opoczynski |
| 5,544,173 A | 8/1996 | Meltzer |
| 5,602,903 A | 2/1997 | Leblanc et al. |
| 5,606,725 A | 2/1997 | Hart |
| 5,615,132 A | 3/1997 | Horton et al. |
| 5,668,562 A | 9/1997 | Cutrer et al. |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,802,173 A | 9/1998 | Hamilton-Piercy et al. |
| 5,809,395 A | 9/1998 | Hamilton-Piercy et al. |
| 5,809,431 A | 9/1998 | Bustamante et al. |
| 5,818,883 A | 10/1998 | Smith et al. |
| 5,839,052 A | 11/1998 | Dean et al. |
| 5,862,460 A | 1/1999 | Rich |
| 5,867,763 A | 2/1999 | Dean et al. |
| 5,873,040 A | 2/1999 | Dunn et al. |
| 5,953,670 A | 9/1999 | Newson |
| 5,969,837 A | 10/1999 | Farber et al. |
| 5,983,070 A | 11/1999 | Georges et al. |
| 6,006,069 A | 12/1999 | Langston |
| 6,011,962 A | 1/2000 | Lindenmeier et al. |
| 6,011,980 A | 1/2000 | Nagano et al. |
| 6,014,546 A | 1/2000 | Georges et al. |
| 6,034,966 A | 3/2000 | Ota |
| 6,037,898 A | 3/2000 | Parish et al. |
| 6,046,838 A | 4/2000 | Kou et al. |
| 6,069,721 A | 5/2000 | Oh et al. |
| 6,108,536 A | 8/2000 | Yafuso et al. |
| 6,118,767 A | 9/2000 | Shen et al. |
| 6,122,529 A | 9/2000 | Sabat et al. |
| 6,128,470 A | 10/2000 | Naidu et al. |
| 6,128,477 A | 10/2000 | Freed |
| 6,157,810 A | 12/2000 | Georges et al. |
| 6,178,334 B1 | 1/2001 | Shyy et al. |
| 6,192,216 B1 | 2/2001 | Sabat et al. |
| 6,194,968 B1 | 2/2001 | Winslow |
| 6,195,561 B1 | 2/2001 | Rose |
| 6,212,397 B1 | 4/2001 | Langston et al. |
| 6,218,979 B1 | 4/2001 | Barnes et al. |
| 6,222,503 B1 | 4/2001 | Gietema et al. |
| 6,223,201 B1 | 4/2001 | Reznak |
| 6,236,365 B1 | 5/2001 | Leblanc et al. |
| 6,236,863 B1 | 5/2001 | Waldroup et al. |
| 6,249,252 B1 | 6/2001 | Dupray |
| 6,253,067 B1 | 6/2001 | Tsuji |
| 6,275,990 B1 | 8/2001 | Dapper et al. |
| 6,279,158 B1 | 8/2001 | Geile et al. |
| 6,286,163 B1 | 9/2001 | Trimble |
| 6,292,132 B1 | 9/2001 | Wilson |
| 6,295,451 B1 | 9/2001 | Mimura |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,330,241 B1 | 12/2001 | Fort |
| 6,330,244 B1 | 12/2001 | Swartz et al. |
| 6,334,219 B1 | 12/2001 | Roberts et al. |
| 6,336,021 B1 | 1/2002 | Nukada |
| 6,336,042 B1 | 1/2002 | Dawson et al. |
| 6,340,932 B1 | 1/2002 | Rodgers et al. |
| 6,370,203 B1 | 4/2002 | Boesch et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,437,577 B1 | 8/2002 | Fritzmann et al. |
| 6,448,558 B1 | 9/2002 | Greene |
| 6,452,915 B1 | 9/2002 | Jorgensen |
| 6,480,702 B1 | 11/2002 | Sabat, Jr. |
| 6,490,439 B1 | 12/2002 | Croft et al. |
| 6,518,916 B1 | 2/2003 | Ashihara et al. |
| 6,519,449 B1 | 2/2003 | Zhang et al. |
| 6,535,330 B1 | 3/2003 | Lelic et al. |
| 6,535,720 B1 | 3/2003 | Kintis et al. |
| 6,580,402 B2 | 6/2003 | Navarro et al. |
| 6,580,905 B1 | 6/2003 | Naidu et al. |
| 6,587,514 B1 | 7/2003 | Wright et al. |
| 6,598,009 B2 | 7/2003 | Yang |
| 6,615,074 B2 | 9/2003 | Mickle et al. |
| 6,628,732 B1 | 9/2003 | Takaki |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |

(56) References Cited

U.S. PATENT DOCUMENTS

| | | |
|---|---|---|
| 6,678,509 B2 | 1/2004 | Skarman et al. |
| 6,704,298 B1 | 3/2004 | Matsumiya et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,763,226 B1 | 7/2004 | McZeal, Jr. |
| 6,771,933 B1 | 8/2004 | Eng et al. |
| 6,782,048 B2 | 8/2004 | Santhoff |
| 6,785,558 B1 | 8/2004 | Stratford et al. |
| 6,801,767 B1 | 10/2004 | Schwartz et al. |
| 6,823,174 B1 | 11/2004 | Masenten et al. |
| 6,826,163 B2 | 11/2004 | Mani et al. |
| 6,836,660 B1 | 12/2004 | Wala |
| 6,836,673 B1 | 12/2004 | Trott |
| 6,842,433 B2 | 1/2005 | West et al. |
| 6,850,510 B2 | 2/2005 | Kubler et al. |
| 6,876,056 B2 | 4/2005 | Tilmans et al. |
| 6,876,945 B2 | 4/2005 | Emord |
| 6,882,311 B2 | 4/2005 | Walker et al. |
| 6,885,344 B2 | 4/2005 | Mohamadi |
| 6,889,060 B2 | 5/2005 | Fernando et al. |
| 6,900,732 B2 | 5/2005 | Richards |
| 6,906,681 B2 | 6/2005 | Hoppenstein |
| 6,909,399 B1 | 6/2005 | Zegelin et al. |
| 6,915,529 B1 | 7/2005 | Suematsu et al. |
| 6,919,858 B2 | 7/2005 | Rofougaran |
| 6,928,281 B2 | 8/2005 | Ward et al. |
| 6,931,659 B1 | 8/2005 | Kinemura |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,952,181 B2 | 10/2005 | Karr et al. |
| 6,961,312 B2 | 11/2005 | Kubler et al. |
| 6,963,727 B2 | 11/2005 | Shreve |
| 6,967,347 B2 | 11/2005 | Estes et al. |
| 6,977,502 B1 | 12/2005 | Hertz |
| 6,983,174 B2 | 1/2006 | Hoppenstein et al. |
| 7,002,511 B1 | 2/2006 | Ammar et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace et al. |
| 7,035,594 B2 | 4/2006 | Wallace et al. |
| 7,039,399 B2 | 5/2006 | Fischer |
| 7,043,271 B1 | 5/2006 | Seto et al. |
| 7,047,028 B2 | 5/2006 | Cagenius |
| 7,050,017 B2 | 5/2006 | King et al. |
| 7,053,838 B2 | 5/2006 | Judd |
| 7,069,577 B2 | 6/2006 | Geile et al. |
| 7,072,586 B2 | 7/2006 | Aburakawa et al. |
| 7,084,758 B1 | 8/2006 | Cole |
| 7,103,119 B2 | 9/2006 | Matsuoka et al. |
| 7,103,377 B2 | 9/2006 | Bauman et al. |
| 7,110,795 B2 | 9/2006 | Doi |
| 7,113,780 B2 | 9/2006 | McKenna et al. |
| 7,129,886 B2 | 10/2006 | Hall et al. |
| 7,142,535 B2 | 11/2006 | Kubler et al. |
| 7,142,619 B2 | 11/2006 | Sommer et al. |
| 7,146,134 B2 | 12/2006 | Moon et al. |
| 7,171,244 B2 | 1/2007 | Bauman |
| 7,177,623 B2 | 2/2007 | Baldwin |
| 7,183,910 B2 | 2/2007 | Alvarez et al. |
| 7,184,728 B2 | 2/2007 | Solum |
| 7,190,748 B2 | 3/2007 | Kim et al. |
| 7,194,023 B2 | 3/2007 | Norrell et al. |
| 7,194,275 B2 | 3/2007 | Bolin et al. |
| 7,196,656 B2 | 3/2007 | Shirakawa |
| 7,199,443 B2 | 4/2007 | Elsharawy |
| 7,233,771 B2 | 6/2007 | Proctor et al. |
| 7,256,727 B2 | 8/2007 | Fullerton et al. |
| 7,260,369 B2 | 8/2007 | Feher |
| 7,272,359 B2 | 9/2007 | Li et al. |
| 7,280,011 B2 | 10/2007 | Bayar et al. |
| 7,298,327 B2 | 11/2007 | Dupray et al. |
| 7,315,735 B2 | 1/2008 | Graham |
| 7,324,476 B2 | 1/2008 | Agrawal et al. |
| 7,324,837 B2 | 1/2008 | Yamakita |
| 7,336,961 B1 * | 2/2008 | Ngan .................... H04W 64/00 455/562.1 |
| 7,348,843 B1 | 3/2008 | Qiu et al. |
| 7,359,674 B2 | 4/2008 | Markki et al. |
| 7,359,718 B2 | 4/2008 | Tao et al. |
| 7,366,151 B2 | 4/2008 | Kubler et al. |
| 7,369,526 B2 | 5/2008 | Lechleider et al. |
| 7,385,384 B2 | 6/2008 | Rocher |
| 7,388,892 B2 | 6/2008 | Nishiyama et al. |
| 7,392,025 B2 | 6/2008 | Rooyen et al. |
| 7,395,181 B2 | 7/2008 | Foxlin |
| 7,412,224 B2 | 8/2008 | Kotola et al. |
| 7,421,288 B2 | 9/2008 | Funakubo |
| 7,450,853 B2 | 11/2008 | Kim et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,471,243 B2 | 12/2008 | Roslak |
| 7,483,711 B2 | 1/2009 | Burchfiel |
| 7,495,560 B2 | 2/2009 | Easton et al. |
| 7,505,747 B2 | 3/2009 | Solum |
| 7,512,419 B2 | 3/2009 | Solum |
| 7,512,450 B2 | 3/2009 | Ahmed |
| 7,525,484 B2 | 4/2009 | Dupray et al. |
| 7,535,796 B2 | 5/2009 | Holm et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,833 B2 | 6/2009 | Ahmed |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,627,218 B2 | 12/2009 | Hurley |
| 7,627,250 B2 | 12/2009 | George et al. |
| 7,630,690 B2 | 12/2009 | Kaewell et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks et al. |
| 7,653,397 B2 | 1/2010 | Pernu et al. |
| 7,668,565 B2 | 2/2010 | Ylaenen et al. |
| 7,679,562 B2 | 3/2010 | Shirakawa |
| 7,688,811 B2 | 3/2010 | Kubler et al. |
| 7,693,486 B2 | 4/2010 | Kasslin et al. |
| 7,693,654 B1 | 4/2010 | Dietsch et al. |
| 7,697,467 B2 | 4/2010 | Kubler et al. |
| 7,697,574 B2 | 4/2010 | Suematsu et al. |
| 7,698,228 B2 | 4/2010 | Gailey et al. |
| 7,714,778 B2 | 5/2010 | Dupray |
| 7,715,375 B2 | 5/2010 | Kubler et al. |
| 7,751,374 B2 | 7/2010 | Donovan |
| 7,751,838 B2 | 7/2010 | Ramesh et al. |
| 7,751,971 B2 | 7/2010 | Chang et al. |
| 7,760,703 B2 | 7/2010 | Kubler et al. |
| 7,764,231 B1 | 7/2010 | Karr et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,787,887 B2 | 8/2010 | Gupta et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,654 B2 | 12/2010 | Sauer et al. |
| 7,848,765 B2 | 12/2010 | Phillips et al. |
| 7,848,770 B2 | 12/2010 | Scheinert |

(56) References Cited

U.S. PATENT DOCUMENTS

| | | |
|---|---|---|
| 7,853,234 B2 | 12/2010 | Afsahi |
| 7,860,518 B2 | 12/2010 | Flanagan et al. |
| 7,860,519 B2 | 12/2010 | Portman et al. |
| 7,864,673 B2 | 1/2011 | Bonner |
| 7,870,321 B2 | 1/2011 | Rofougaran |
| 7,880,677 B2 | 2/2011 | Rofougaran et al. |
| 7,881,665 B2 | 2/2011 | Symons |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,903,029 B2 | 3/2011 | Dupray |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,066 B1 | 3/2011 | Osterweil |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,952,512 B1 | 5/2011 | Delker et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,970,648 B2 | 6/2011 | Gailey et al. |
| 7,990,925 B2 | 8/2011 | Tinnakornsrisuphap et al. |
| 7,996,020 B1 | 8/2011 | Chhabra |
| 7,996,281 B2 | 8/2011 | Alvarez et al. |
| 8,005,050 B2 | 8/2011 | Scheinert et al. |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,032,153 B2 | 10/2011 | Dupray et al. |
| 8,036,308 B2 | 10/2011 | Rofougaran |
| 8,072,381 B1 | 12/2011 | Ziegler |
| 8,073,565 B2 | 12/2011 | Johnson |
| 8,081,923 B1 * | 12/2011 | Larsen ................... G01S 5/06 455/18 |
| 8,082,096 B2 | 12/2011 | Dupray |
| 8,082,353 B2 | 12/2011 | Huber et al. |
| 8,086,192 B2 | 12/2011 | Rofougaran et al. |
| 8,090,383 B1 | 1/2012 | Emigh et al. |
| 8,111,998 B2 | 2/2012 | George et al. |
| 8,135,413 B2 | 3/2012 | Dupray |
| 8,203,910 B2 | 6/2012 | Zhao et al. |
| 8,213,264 B2 | 7/2012 | Lee et al. |
| 8,233,920 B2 | 7/2012 | Gerstenberger et al. |
| 8,326,315 B2 | 12/2012 | Phillips et al. |
| 8,346,278 B2 | 1/2013 | Wala et al. |
| 8,364,171 B2 | 1/2013 | Busch |
| 8,442,556 B2 | 5/2013 | Rawat et al. |
| 8,457,013 B2 | 6/2013 | Essinger et al. |
| 8,570,914 B2 | 10/2013 | Sauer |
| 8,604,909 B1 | 12/2013 | Amir et al. |
| 8,774,843 B2 | 7/2014 | Mangold et al. |
| 8,983,301 B2 | 3/2015 | Baker et al. |
| RE45,505 E | 5/2015 | Scheinert et al. |
| 9,158,864 B2 | 10/2015 | Berlin et al. |
| 9,184,843 B2 | 11/2015 | Berlin et al. |
| 9,185,674 B2 | 11/2015 | Sauer |
| 9,443,358 B2 | 9/2016 | Breed |
| 9,532,329 B2 | 12/2016 | Sauer |
| 2001/0017896 A1 | 8/2001 | Murakami et al. |
| 2001/0022782 A1 | 9/2001 | Steudle |
| 2001/0036199 A1 | 11/2001 | Terry |
| 2002/0051434 A1 | 5/2002 | Ozluturk et al. |
| 2002/0123365 A1 | 9/2002 | Thorson et al. |
| 2002/0128009 A1 | 9/2002 | Boch et al. |
| 2002/0147016 A1 | 10/2002 | Arazi et al. |
| 2002/0177451 A1 | 11/2002 | Ogasawara |
| 2003/0078074 A1 | 4/2003 | Sesay et al. |
| 2003/0083052 A1 | 5/2003 | Hosaka |
| 2003/0142587 A1 | 7/2003 | Zeitzew |
| 2003/0146871 A1 | 8/2003 | Karr et al. |
| 2003/0157943 A1 | 8/2003 | Sabat |
| 2003/0220835 A1 | 11/2003 | Barnes |
| 2004/0022215 A1 | 2/2004 | Okuhata et al. |
| 2004/0091033 A1 | 5/2004 | Chen |
| 2004/0095907 A1 | 5/2004 | Agee et al. |
| 2004/0102196 A1 | 5/2004 | Weckstrom et al. |
| 2004/0131025 A1 | 7/2004 | Dohler et al. |
| 2004/0139477 A1 | 7/2004 | Russell et al. |
| 2004/0146020 A1 | 7/2004 | Kubler et al. |
| 2004/0151164 A1 | 8/2004 | Kubler et al. |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0165573 A1 | 8/2004 | Kubler et al. |
| 2004/0175173 A1 | 9/2004 | Deas |
| 2004/0179852 A1 | 9/2004 | Westbrook et al. |
| 2004/0196404 A1 | 10/2004 | Loheit et al. |
| 2004/0198386 A1 | 10/2004 | Dupray |
| 2004/0235497 A1 | 11/2004 | Zekavat |
| 2004/0246926 A1 | 12/2004 | Belcea et al. |
| 2005/0003873 A1 | 1/2005 | Naidu et al. |
| 2005/0020309 A1 | 1/2005 | Moeglein et al. |
| 2005/0025487 A1 | 2/2005 | Kwon et al. |
| 2005/0040968 A1 | 2/2005 | Damarla et al. |
| 2005/0102180 A1 | 5/2005 | Gailey et al. |
| 2005/0143091 A1 | 6/2005 | Shapira et al. |
| 2005/0147071 A1 | 7/2005 | Karaoguz et al. |
| 2005/0148306 A1 | 7/2005 | Hiddink |
| 2005/0153712 A1 | 7/2005 | Osaka et al. |
| 2005/0246094 A1 | 11/2005 | Moscatiello |
| 2005/0272439 A1 | 12/2005 | Picciriello et al. |
| 2005/0281213 A1 | 12/2005 | Dohn |
| 2006/0014548 A1 | 1/2006 | Bolin et al. |
| 2006/0025158 A1 | 2/2006 | Leblanc et al. |
| 2006/0033662 A1 | 2/2006 | Ward et al. |
| 2006/0056327 A1 | 3/2006 | Coersmeier |
| 2006/0092880 A1 | 5/2006 | Nounin et al. |
| 2006/0120730 A1 | 6/2006 | Drentea |
| 2006/0136544 A1 | 6/2006 | Atsmon et al. |
| 2006/0183504 A1 | 8/2006 | Tanaka et al. |
| 2006/0197704 A1 | 9/2006 | Luzzatto et al. |
| 2006/0209752 A1 | 9/2006 | Wijngaarden et al. |
| 2006/0223439 A1 | 10/2006 | Pinel et al. |
| 2006/0274704 A1 | 12/2006 | Desai et al. |
| 2006/0276202 A1 | 12/2006 | Moeglein et al. |
| 2007/0004437 A1 | 1/2007 | Harada et al. |
| 2007/0025738 A1 | 2/2007 | Moore |
| 2007/0025739 A1 | 2/2007 | Moore et al. |
| 2007/0054682 A1 | 3/2007 | Fanning et al. |
| 2007/0057761 A1 | 3/2007 | Johnson |
| 2007/0060045 A1 | 3/2007 | Prautzsch |
| 2007/0060055 A1 | 3/2007 | Desai et al. |
| 2007/0070812 A1 | 3/2007 | Lee |
| 2007/0076649 A1 | 4/2007 | Lin et al. |
| 2007/0093273 A1 | 4/2007 | Cai |
| 2007/0104128 A1 | 5/2007 | Laroia et al. |
| 2007/0104164 A1 | 5/2007 | Laroia et al. |
| 2007/0140168 A1 | 6/2007 | Laroia et al. |
| 2007/0172241 A1 | 7/2007 | Kwon et al. |
| 2007/0202844 A1 | 8/2007 | Wilson et al. |
| 2007/0224954 A1 | 9/2007 | Gopi |
| 2007/0253355 A1 | 11/2007 | Hande et al. |
| 2007/0257796 A1 | 11/2007 | Easton et al. |
| 2007/0268846 A1 | 11/2007 | Proctor et al. |
| 2007/0268853 A1 | 11/2007 | Ma et al. |
| 2007/0286599 A1 | 12/2007 | Sauer et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0013482 A1 | 1/2008 | Kurokawa |
| 2008/0043714 A1 | 2/2008 | Pernu |
| 2008/0045234 A1 | 2/2008 | Reed |
| 2008/0054072 A1 | 3/2008 | Katragadda et al. |
| 2008/0058018 A1 | 3/2008 | Scheinert |
| 2008/0063397 A1 | 3/2008 | Hu et al. |
| 2008/0077326 A1 | 3/2008 | Funk et al. |
| 2008/0080863 A1 | 4/2008 | Sauer et al. |

(56) References Cited

U.S. PATENT DOCUMENTS

| | | |
|---|---|---|
| 2008/0098203 A1 | 4/2008 | Master et al. |
| 2008/0101277 A1 | 5/2008 | Taylor et al. |
| 2008/0118014 A1 | 5/2008 | Reunamaki et al. |
| 2008/0119208 A1 | 5/2008 | Flanagan et al. |
| 2008/0129634 A1 | 6/2008 | Pera et al. |
| 2008/0134194 A1 | 6/2008 | Liu |
| 2008/0152344 A1 | 6/2008 | Deas |
| 2008/0166094 A1 | 7/2008 | Bookbinder et al. |
| 2008/0167049 A1 | 7/2008 | Karr et al. |
| 2008/0194226 A1 | 8/2008 | Rivas et al. |
| 2008/0201226 A1 | 8/2008 | Carlson et al. |
| 2008/0207253 A1 | 8/2008 | Jaakkola et al. |
| 2008/0232328 A1 | 9/2008 | Scheinert et al. |
| 2008/0246613 A1 | 10/2008 | Linstrom et al. |
| 2008/0247758 A1 | 10/2008 | Nichols |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0268871 A1 | 10/2008 | Kim et al. |
| 2008/0270522 A1 | 10/2008 | Souissi |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0310341 A1 | 12/2008 | Koyanagi |
| 2008/0310464 A1 | 12/2008 | Schneider |
| 2008/0311876 A1 | 12/2008 | Leenaerts et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0046688 A1 | 2/2009 | Volpi et al. |
| 2009/0059903 A1 | 3/2009 | Kubler et al. |
| 2009/0061796 A1 | 3/2009 | Arkko et al. |
| 2009/0061899 A1 | 3/2009 | Hwang et al. |
| 2009/0073054 A1 | 3/2009 | Yoon et al. |
| 2009/0073885 A1 | 3/2009 | Jalil et al. |
| 2009/0073916 A1 | 3/2009 | Zhang et al. |
| 2009/0088071 A1 | 4/2009 | Rofougaran |
| 2009/0097855 A1 | 4/2009 | Thelen et al. |
| 2009/0140923 A1 | 6/2009 | Graves et al. |
| 2009/0141780 A1 | 6/2009 | Cruz-Albrecht et al. |
| 2009/0143076 A1 | 6/2009 | Wachter et al. |
| 2009/0149221 A1 | 6/2009 | Liu et al. |
| 2009/0154294 A1 | 6/2009 | Jeong et al. |
| 2009/0163224 A1 | 6/2009 | Dean et al. |
| 2009/0169163 A1 | 7/2009 | Abbott et al. |
| 2009/0175214 A1 | 7/2009 | Sfar et al. |
| 2009/0176507 A1 | 7/2009 | Wu et al. |
| 2009/0190441 A1 | 7/2009 | Zhao et al. |
| 2009/0191891 A1 | 7/2009 | Ma et al. |
| 2009/0216449 A1 | 8/2009 | Erko et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0238566 A1 | 9/2009 | Boldi et al. |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0262604 A1 | 10/2009 | Funada |
| 2009/0278596 A1 | 11/2009 | Rofougaran et al. |
| 2009/0279593 A1 | 11/2009 | Rofougaran et al. |
| 2009/0280835 A1 | 11/2009 | Males et al. |
| 2009/0285147 A1 | 11/2009 | Subasic et al. |
| 2009/0316529 A1 | 12/2009 | Huuskonen et al. |
| 2009/0316842 A1 | 12/2009 | Lu et al. |
| 2010/0002626 A1 | 1/2010 | Schmidt et al. |
| 2010/0007485 A1 | 1/2010 | Kodrin et al. |
| 2010/0008337 A1 | 1/2010 | Bajko |
| 2010/0027443 A1 | 2/2010 | Logalbo et al. |
| 2010/0048163 A1 | 2/2010 | Parr et al. |
| 2010/0056200 A1 | 3/2010 | Tolonen |
| 2010/0061291 A1 | 3/2010 | Wala |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0097268 A1 | 4/2010 | Roh |
| 2010/0118864 A1 | 5/2010 | Kubler et al. |
| 2010/0121567 A1 | 5/2010 | Mendelson |
| 2010/0127937 A1 | 5/2010 | Chandrasekaran et al. |
| 2010/0128568 A1 | 5/2010 | Han et al. |
| 2010/0130233 A1 | 5/2010 | Parker |
| 2010/0134257 A1 | 6/2010 | Puleston et al. |
| 2010/0135178 A1 | 6/2010 | Aggarwal et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0151821 A1 | 6/2010 | Sweeney et al. |
| 2010/0156721 A1 | 6/2010 | Alamouti et al. |
| 2010/0157738 A1 | 6/2010 | Izumi et al. |
| 2010/0159859 A1 | 6/2010 | Rofougaran |
| 2010/0178936 A1 | 7/2010 | Wala et al. |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0234045 A1 | 9/2010 | Karr et al. |
| 2010/0246558 A1 | 9/2010 | Harel |
| 2010/0254356 A1 | 10/2010 | Tynderfeldt et al. |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0273504 A1 | 10/2010 | Bull et al. |
| 2010/0284323 A1 | 11/2010 | Tang et al. |
| 2010/0287011 A1 | 11/2010 | Muchkaev |
| 2010/0290355 A1 | 11/2010 | Roy et al. |
| 2010/0291949 A1 | 11/2010 | Shapira et al. |
| 2010/0309049 A1 | 12/2010 | Reunamaeki et al. |
| 2010/0309752 A1 | 12/2010 | Lee et al. |
| 2010/0311472 A1 | 12/2010 | Rofougaran et al. |
| 2010/0311480 A1 | 12/2010 | Raines et al. |
| 2010/0317371 A1 | 12/2010 | Westerinen et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0028157 A1 | 2/2011 | Larsen |
| 2011/0028161 A1 | 2/2011 | Larsen |
| 2011/0035284 A1 | 2/2011 | Moshfeghi |
| 2011/0050501 A1 | 3/2011 | Aljadeff |
| 2011/0065450 A1 | 3/2011 | Kazmi |
| 2011/0066774 A1 | 3/2011 | Rofougaran |
| 2011/0068981 A1 | 3/2011 | Marks et al. |
| 2011/0069668 A1 | 3/2011 | Chion et al. |
| 2011/0071734 A1 | 3/2011 | Van et al. |
| 2011/0071785 A1 | 3/2011 | Heath |
| 2011/0086614 A1 | 4/2011 | Brisebois et al. |
| 2011/0116572 A1 | 5/2011 | Lee et al. |
| 2011/0122912 A1 | 5/2011 | Benjamin et al. |
| 2011/0124347 A1 | 5/2011 | Chen et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0159876 A1 | 6/2011 | Segall et al. |
| 2011/0159891 A1 | 6/2011 | Segall et al. |
| 2011/0171912 A1 | 7/2011 | Beck et al. |
| 2011/0171946 A1 | 7/2011 | Soehren |
| 2011/0171973 A1 | 7/2011 | Beck et al. |
| 2011/0182230 A1 | 7/2011 | Ohm et al. |
| 2011/0194475 A1 | 8/2011 | Kim et al. |

(56) References Cited

U.S. PATENT DOCUMENTS

| | | |
|---|---|---|
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0210843 A1* | 9/2011 | Kummetz ............ G01S 5/0289 340/517 |
| 2011/0211439 A1 | 9/2011 | Manpuria et al. |
| 2011/0215901 A1 | 9/2011 | Van et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0268452 A1 | 11/2011 | Beamon et al. |
| 2011/0274021 A1 | 11/2011 | He et al. |
| 2011/0279445 A1 | 11/2011 | Murphy et al. |
| 2011/0281536 A1 | 11/2011 | Lee et al. |
| 2011/0312340 A1 | 12/2011 | Wu et al. |
| 2012/0028649 A1 | 2/2012 | Gupta et al. |
| 2012/0039320 A1 | 2/2012 | Lemson et al. |
| 2012/0046049 A1 | 2/2012 | Curtis et al. |
| 2012/0058775 A1 | 3/2012 | Dupray et al. |
| 2012/0065926 A1 | 3/2012 | Lee et al. |
| 2012/0072106 A1 | 3/2012 | Han et al. |
| 2012/0081248 A1 | 4/2012 | Kennedy et al. |
| 2012/0084177 A1 | 4/2012 | Tanaka et al. |
| 2012/0087212 A1 | 4/2012 | Vartanian et al. |
| 2012/0095779 A1 | 4/2012 | Wengrovitz et al. |
| 2012/0108258 A1 | 5/2012 | Li |
| 2012/0130632 A1 | 5/2012 | Bandyopadhyay et al. |
| 2012/0135755 A1 | 5/2012 | Lee et al. |
| 2012/0158297 A1 | 6/2012 | Kim et al. |
| 2012/0158509 A1 | 6/2012 | Zivkovic et al. |
| 2012/0179548 A1 | 7/2012 | Sun et al. |
| 2012/0179549 A1 | 7/2012 | Sigmund et al. |
| 2012/0179561 A1 | 7/2012 | Sun et al. |
| 2012/0196626 A1 | 8/2012 | Fano et al. |
| 2012/0215438 A1 | 8/2012 | Liu et al. |
| 2012/0221392 A1 | 8/2012 | Baker et al. |
| 2012/0232917 A1 | 9/2012 | Al-Khudairy et al. |
| 2012/0243469 A1 | 9/2012 | Klein |
| 2012/0303446 A1 | 11/2012 | Busch |
| 2012/0303455 A1 | 11/2012 | Busch |
| 2012/0309336 A1 | 12/2012 | Tanaka et al. |
| 2012/0310836 A1 | 12/2012 | Eden et al. |
| 2013/0006663 A1 | 1/2013 | Bertha et al. |
| 2013/0006849 A1 | 1/2013 | Morris |
| 2013/0036012 A1 | 2/2013 | Lin et al. |
| 2013/0040654 A1 | 2/2013 | Parish |
| 2013/0041761 A1 | 2/2013 | Voda |
| 2013/0045758 A1 | 2/2013 | Khorashadi et al. |
| 2013/0046691 A1 | 2/2013 | Culton |
| 2013/0066821 A1 | 3/2013 | Moore et al. |
| 2013/0073336 A1 | 3/2013 | Heath |
| 2013/0073377 A1 | 3/2013 | Heath |
| 2013/0073388 A1 | 3/2013 | Heath |
| 2013/0073422 A1 | 3/2013 | Moore et al. |
| 2013/0080578 A1 | 3/2013 | Murad et al. |
| 2013/0084859 A1 | 4/2013 | Azar |
| 2013/0109314 A1 | 5/2013 | Kneckt et al. |
| 2013/0116922 A1 | 5/2013 | Cai et al. |
| 2013/0131972 A1 | 5/2013 | Kumar et al. |
| 2013/0136119 A1 | 5/2013 | Hund et al. |
| 2013/0157664 A1 | 6/2013 | Chow et al. |
| 2013/0226451 A1 | 8/2013 | O'Neill et al. |
| 2013/0281125 A1 | 10/2013 | Schmidt |
| 2013/0314210 A1 | 11/2013 | Schoner et al. |
| 2013/0322214 A1 | 12/2013 | Neukirch et al. |
| 2013/0322415 A1 | 12/2013 | Chamarti et al. |
| 2014/0050482 A1 | 2/2014 | Berlin et al. |
| 2014/0112667 A1 | 4/2014 | Neukirch et al. |
| 2014/0180581 A1 | 6/2014 | Berlin et al. |
| 2014/0213285 A1 | 7/2014 | Sauer |
| 2014/0233548 A1 | 8/2014 | Leizerovich et al. |
| 2014/0323150 A1 | 10/2014 | Mangold et al. |
| 2014/0347985 A1 | 11/2014 | Yi et al. |
| 2015/0005005 A1 | 1/2015 | Neukirch et al. |
| 2015/0087329 A1 | 3/2015 | Stratford et al. |
| 2015/0155942 A1 | 6/2015 | Baker et al. |
| 2015/0268327 A1 | 9/2015 | Neukirch et al. |
| 2015/0317557 A1 | 11/2015 | Julian et al. |
| 2017/0149504 A1 | 5/2017 | Daniel et al. |
| 2017/0150316 A1 | 5/2017 | George et al. |

FOREIGN PATENT DOCUMENTS

| | | |
|---|---|---|
| CN | 1242911 A | 1/2000 |
| EP | 0732827 A2 | 9/1996 |
| EP | 0851618 A2 | 7/1998 |
| EP | 1124211 A2 | 8/2001 |
| EP | 1227605 A2 | 7/2002 |
| EP | 1347584 A2 | 9/2003 |
| EP | 1448008 A1 | 8/2004 |
| EP | 1005774 B1 | 3/2007 |
| EP | 1954019 A1 | 8/2008 |
| EP | 2192811 A1 | 6/2010 |
| JP | 2002-353813 A | 12/2002 |
| JP | 2009-288245 A | 12/2009 |
| WO | 96/03823 A1 | 2/1996 |
| WO | 99/53838 A1 | 10/1999 |
| WO | 00/72475 A1 | 11/2000 |
| WO | 02/87275 A2 | 10/2002 |
| WO | 03/24027 A1 | 3/2003 |
| WO | 2005/060338 A2 | 7/2005 |
| WO | 2006/076600 A1 | 7/2006 |
| WO | 2008/099383 A2 | 8/2008 |
| WO | 2008/099390 A2 | 8/2008 |
| WO | 2009/081376 A2 | 7/2009 |
| WO | 2009/097237 A1 | 8/2009 |
| WO | 2010/090999 A1 | 8/2010 |
| WO | 2011/017700 A1 | 2/2011 |
| WO | 2011/091859 A1 | 8/2011 |
| WO | 2011/123336 A1 | 10/2011 |

OTHER PUBLICATIONS

"Safe Campus Solutions: Going Beyond Emergency Notification," www.alcatel-lucent.com, 8 pages, Aug. 21, 2012.

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Author Unknown, "CDMA Co-Pilot Transmitter," Product Specifications, Cellular Specialties, Inc., 021-0000-001 Mktg Rev 2, Aug. 2009, www.cellularspecialties.com, 2 pages.

Author Unknown, "Fiber Optic Distributed Antenna System," Installation and Users Guide, ERAU Version 1.5, May 2002, Andrews Corporation, 53 pages.

Author Unknown, "Safe Campus Solutions: Going Beyond Emergency Notification," Strategic White Paper, Alcatel-Lucent, Sep. 2008, 13 pages.

Cho et al. "The Forward Link Performance of a PCS System with an AGC," 4th CDMA International Conference and Exhibition, "The Realization of IMT-2000," 1999, pp. 236-240, vol. 2.

Chow et al, "Radio-over-Fiber Distributed Antenna System for WiMAX Bullet Train Field Trial," IEEE Mobile WiMAX Symposium, Jul. 9-10, 2009, Napa Valley, California, 4 pages.

Chu, Ta-Shing S. et al. "Fiber optic microcellular radio", IEEE Transactions on Vehicular Technology, Aug. 1991, pp. 599-606, vol. 40, Issue 3.

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.

(56) References Cited

OTHER PUBLICATIONS

Ellinger, Frank et al., "A 5.2 GHz variable gain LNA MMIC for adaptive antenna combining", IEEE Radio Frequency Integrated Circuits (RFIC) Symposium, Anaheim, California, Jun. 13-15, 1999, pp. 197-200.

Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.

Federal Communications Commision (FCC), "Revision of Part 15 of the Commission's Rules Regarding Ultra-Wideband Transmission Systems," First Report and Order, ET Docket 98-153, Fcc 02-48; Released Apr. 22, 2002, 118 pages.

Gansemer, Sebastian et al., "RSSI-based Euclidean Distance Algorithm for Indoor Positioning adapted for the use in dynamically changing WLAN environments and multi-level buildings," International Conference on Indoor Positioning and Indoor Navigation (IPIN), Sep. 15-17, 2010, Zurich, Switzerland, 2 pages.

Gezici, Sinan, et al., "Localization via Ultra-Wideband Radios: A look at positioning aspects of future sensor networks," IEEE Signal Processing Magazine, vol. 22, No. 4, Jul. 2005, pp. 70-84.

Girard, et al., Indoor Pedestrian Navigation Using Foot-Mounted IMU and Portable Ultrasound Range Sensors, www.mdpi.com/journal/sensors, Aug. 2, 2011, pp. 7606-7624.

Ho, K. C. et al., "Solution and Performance Analysis of Geolocation by TDOA," IEEE Transactions on Aerospace and Electronic Systems, vol. 29, No. 4, Oct. 1993, pp. 1311-1322.

Ingram, Si., et al., "Ultra WideBand Indoor Positioning Systems and their Use in Emergencies," Position Location and Navigation Symposium, Apr. 2004, pp. 706-715.

International Preliminary Report on Patentability of the International Searching Authority; PCT/US10/044884; dated Feb. 16, 2012; 11 Pages; Commissiolner for Patents.

International Search Report and Written Opinion of the International Searching Authority; PCT/US10/044884; dated Oct. 6, 2010; 4 Pages; Commissioner for Patents.

Kim, et al, "Smartphone-Based Collaborative and Autonomous Radio Fingerprinting," IEEE Transactions on Systems, Man, and Cybernetics—Part C: Applications and Reviews, vol. 42, No. 1, Jan. 2012, pp. 112-122.

Krempels et al., "Directory-Less Indoor Positioning for WLAN Infrastructures extended abstract," IEEE International Symposium on Consumer Electronics, Apr. 14-16, 2008, Vilamoura, Portugal, 2 pages.

Luo, B., et al., "Centralized UWB/WLAN Distribution Network using Low Cost Radio Over Multimode Fiber Technology," IEEE Vehicular Technology Conference, Sep. 2005, pp. 799-801.

Mokni, et al., "Couples sonar inertial navigation system for pedestrian tracking," 8 pages, Aug. 21, 2012.

Sauer, Michael, et al., "Experimental investigation of multimode fiber bandwidth requirements for 5.2 GHz WLAN signal transmission," Optical Fiber Communication Conference, Mar. 2006, Anaheim, California, 3 pages.

Sauer, Michael, et al., "Experimental Study of Radio Frequency Transmission over Standard and High-Bandwidth Multimode Optical Fibers," International Topical Meeting on Microwave Photonics, Oct. 2005, pp. 99-102.

Schweber, Bill, "Maintaining cellular connectivity indoors demands sophisticated design," EDN Network, Dec. 21, 2000, 2 pages, http://www.edn.com/design/integrated-circuit-design/4362776/Maintaining-c-ellular-connectivity-indoors-demands-sophisticated-design.

Shibuya, Akinori et al., "A High-Accuracy Pedestrian Positioning Information System Using Pico Cell Techniques," Vehicular Technology Conference Proceedings, May 15-18, 2000, Tokyo, Japan, IEEE, pp. 496-500.

Wah, Michael, et al., "Wireless Ultra Wideband Communications Using Radio Over Fiber," IEEE Conference on Ultra Wideband Systems and Technologies, Nov. 2003, pp. 265-269.

Windyka, John et al., "System-Level Integrated Circuit (SLIC) Technology Development for Phased Array Antenna Applications," Contractor Report 204132, National Aeronautics and Space Administration, Jul. 1997, 94 pages.

\* cited by examiner

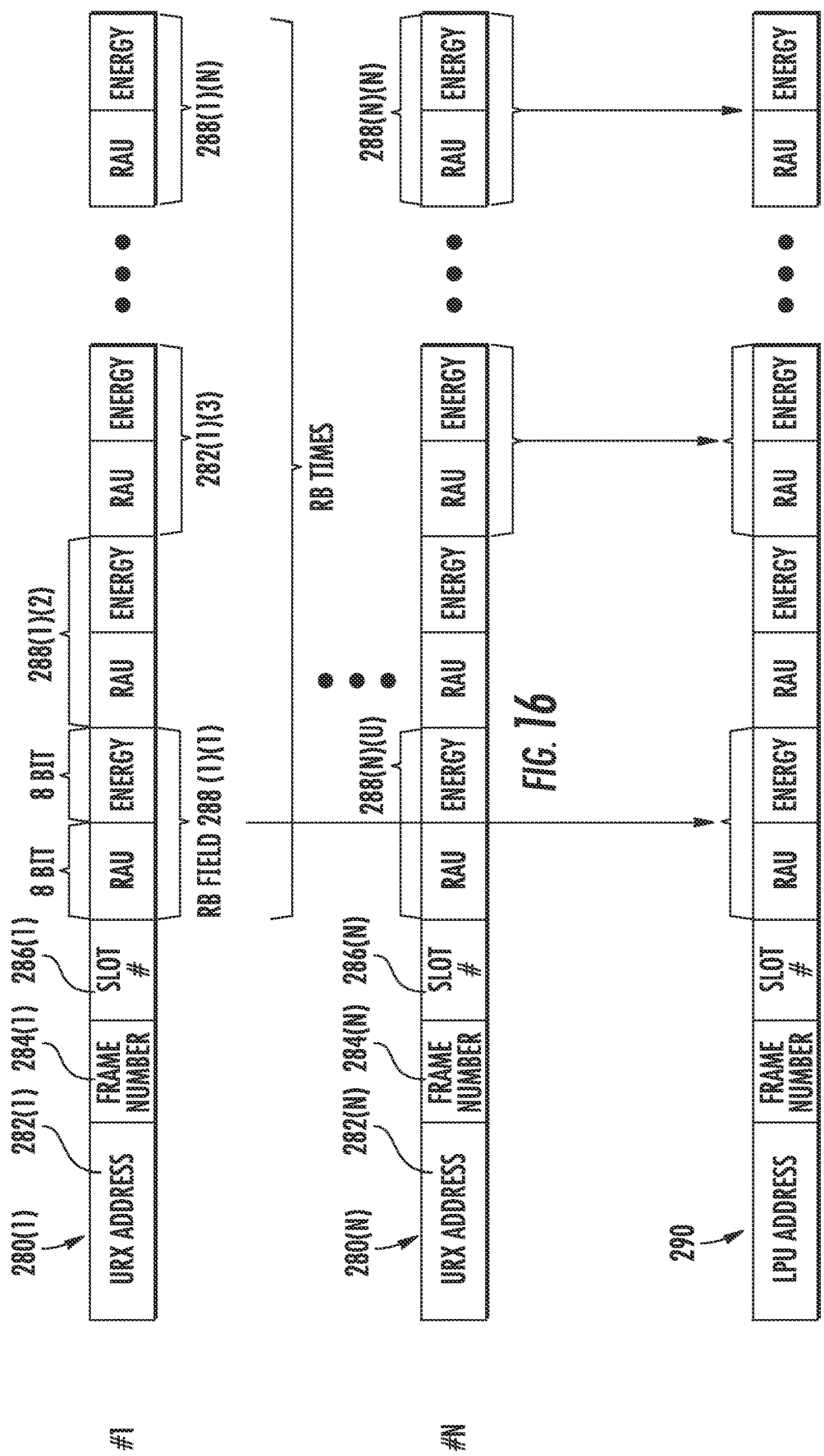

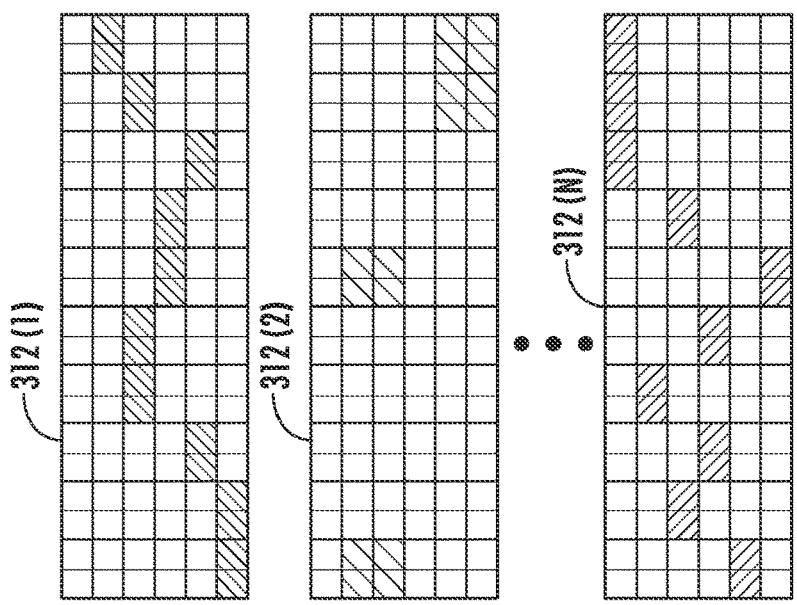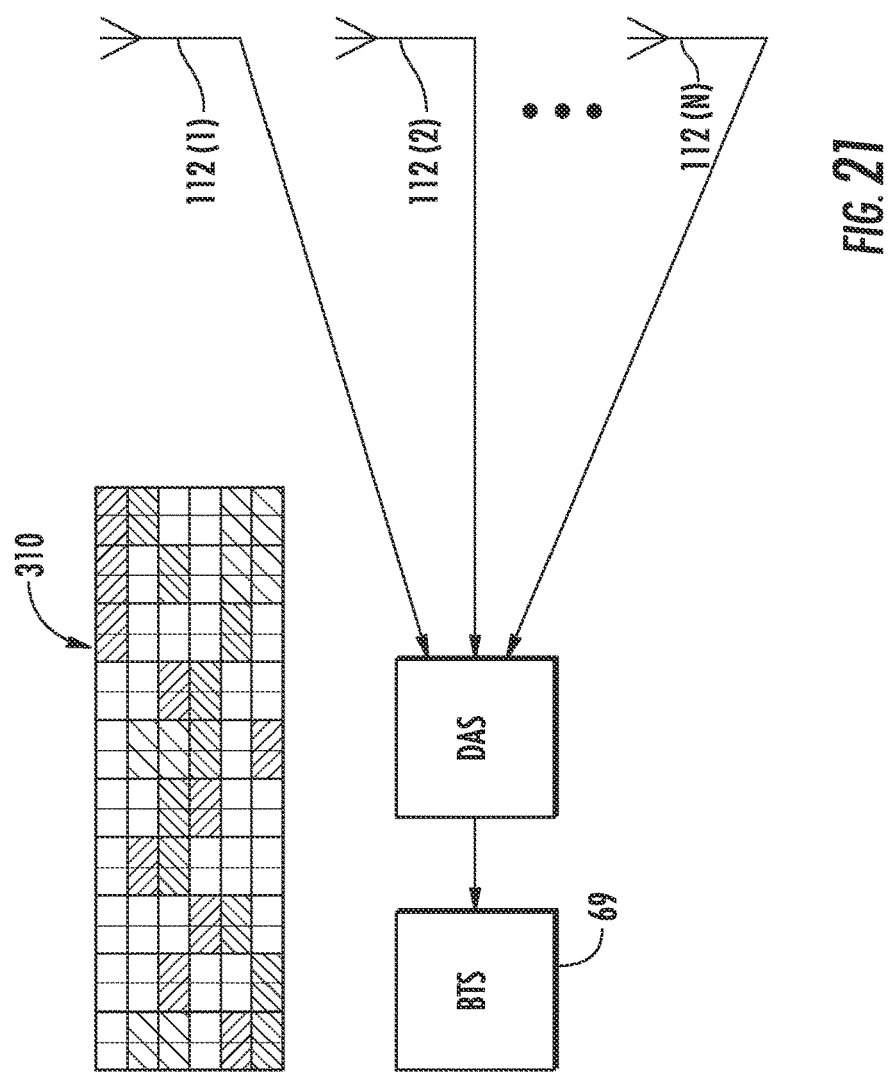
FIG. 21

APPARATUSES, SYSTEMS, AND METHODS FOR DETERMINING LOCATION OF A MOBILE DEVICE(S) IN A DISTRIBUTED ANTENNA SYSTEM(S)

RELATED APPLICATIONS

This application is a continuation of U.S. patent application Ser. No. 16/539,927, filed Aug. 13, 2019, which is a continuation of U.S. patent application Ser. No. 15/876,754, filed Jan. 22, 2018, now U.S. Pat. No. 10,448,205, which is a continuation of U.S. patent application Ser. No. 15/356,723, filed on Nov. 21, 2016, now U.S. Pat. No. 9,913,094, which is a continuation of U.S. patent application Ser. No. 14/873,483, filed Oct. 2, 2015, now U.S. Pat. No. 9,532,329, which is continuation of U.S. patent application Ser. No. 14/034,948, filed Sep. 24, 2013, now U.S. Pat. No. 9,185,674, which is a continuation of U.S. patent application Ser. No. 13/365,843, filed on Feb. 3, 2012, now U.S. Pat. No. 8,570,914, which is a continuation of International App. No. PCT/US2010/044884, filed Aug. 9, 2010, the contents of which are relied upon and incorporated herein by reference in their entireties, and the benefit of priority under 35 U.S.C. § 120 is hereby claimed.

BACKGROUND

Field of the Disclosure

The technology of the disclosure relates to distributed antenna and communications systems, including mobile distributed telecommunication systems and networks, for distributing communications signals to remote antenna units. The distributed antenna and communications systems can include any type of media, including but not limited to optical fiber to provide an optical fiber-based distributed antenna system.

Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed antenna systems communicate with wireless devices called "clients" or "client devices," which must reside within the wireless range or "cell coverage area" in order to communicate with an access point device. A distributed antenna system (DAS) comprises multiple antennas connected to a common cellular base station and can provide cellular coverage over the same area as a single antenna.

One approach to deploying a distributed antenna system involves the use of radio frequency (RF) antenna coverage areas, also referred to as "antenna coverage areas." Antenna coverage areas can have a radius in the range from a few meters up to twenty meters as examples. Combining a number of access point devices creates an array of antenna coverage areas. Because the antenna coverage areas each cover a small area, there are typically only a few users (clients) per antenna coverage area. This allows for minimizing the amount of RF bandwidth shared among the wireless system users.

A distributed antenna system can be implemented to provide adequate cellular telephone and internet coverage within an area where the propagation of an RF signal is disturbed. For example, transmission and reception of RF signals are often blocked inside high buildings due to thick steel, concrete floors and walls. Similar problems can be found in other areas such as airports, shopping malls or tunnels, etc. To overcome this coverage problem, a distributed antenna system may comprise components that receive an input RF signal and convert it to a wired signal, for example, an optical signal. The distributed antenna system may include fiber optic cables to transmit optical signals in an area where RF signals are blocked, e.g., inside the buildings. The antennas can be placed close to the possible locations of mobile or portable terminals, originated from a utility or service room and then arranged to form a star-like topology. The distributed antenna system may also comprise components that re-convert the wired signals back to the RF signals.

As discussed above, it may be desired to provide such distributed antenna systems indoors, such as inside a building or other facility, to provide indoor wireless communication for clients. Otherwise, wireless reception may be poor or not possible for wireless communication clients located inside the building. In this regard, the remote antenna units can be distributed throughout locations inside a building to extend wireless communication coverage throughout the building. While extending the remote antenna units to locations in the building can provide seamless wireless coverage to wireless clients, other services may be negatively affected or not possible due to the indoor environment. For example, it may be desired or required to determine the location of client devices or provide localization services for client devices, such as emergency 911 (E911) services as an example. If the client device is located indoors, techniques such as global positioning services (GPSs) may not be possible to determine the location of the client device. Further, triangulation techniques may not be able to determine the location of the client device due to the remote antenna units typically being arranged to avoid overlapping regions between antenna coverage areas.

SUMMARY OF THE DETAILED DESCRIPTION

Embodiments disclosed in the detailed description include distributed antenna apparatuses, systems, methods, and computer-readable mediums to provide location information regarding client devices communicating with remote antenna units in a distributed antenna system. The location information can be used to determine the location of the client devices relative to the remote antenna unit(s) in which the client devices are communicating. In this scenario, the client devices would be known to be within communication range of the remote antenna units. This information can be used to determine or provide a more precise area of location of the client devices. The distributed antenna components and systems, and related methods disclosed herein may be well suited for indoor environments where other methods of providing and/or determining the location of client devices may be obstructed or not possible due to the indoor environment.

In this regard, in certain embodiments disclosed herein, a location processing unit (LPU) configured to provide location information for at least one client device wirelessly communicating in a distributed antenna system can be provided. The LPU includes a control system configured to receive uplink radio frequency (RF) signals communicated by at least one client device wirelessly communicating to a plurality of antenna units. The control system is further configured to determine the signal strengths of the uplink RF signals. The control system is further configured to determine which antenna unit among the plurality of antenna units is receiving uplink RF signals from the at least one client device having the greatest signal strength. The control system is further configured to determine location information for the at least one client device based on identification of the antenna unit receiving the uplink RF signals from the at least one client device having the greatest signal strength.

In another embodiment, a method of determining location information for at least one client device wirelessly communicating in a distributed antenna system is provided. The method includes receiving uplink RF signals communicated by at least one client device wirelessly communicating to a plurality of antenna units. The method further includes determining the signal strengths of the uplink RF signals. The method further includes determining which antenna unit among the plurality of antenna units is receiving uplink RF signals from the at least one client device having the greatest signal strength. The method further includes determining the location of the at least one client device based on identification of the antenna unit receiving the uplink RF signals from the at least one client device having the greatest signal strength.

In another embodiment, a computer-readable medium having stored thereon computer-executable instructions to cause an LPU configured to determine the location of at least one client device wirelessly communicating in a distributed antenna system is provided. The computer-executable instructions cause the LPU to receive uplink RF signals communicated by at least one client device wirelessly communicating to a plurality of antenna units. The computer-executable instructions cause the LPU to determine the signal strengths of the uplink RF signals. The computer-executable instructions cause the LPU to determine which antenna unit among the plurality of antenna units is receiving uplink RF signals from the at least one client device having the greatest signal strength. The computer-executable instructions cause the LPU to determine location information for the at least one client device based on identification of the antenna unit receiving the uplink RF signals from the at least one client device having the greatest signal strength.

In another embodiment, a head-end unit configured to determine the location of at least one client device wirelessly communicating in a distributed antenna system is provided. The head-end unit comprises an uplink receiver (URX) configured to receive uplink RF signals communicated by at least one client device wirelessly communicating to a plurality of antenna units. The URX is further configured to determine the signal strengths of the uplink RF signals. The URX is further configured to provide the signal strengths of the uplink RF signals to an LPU. The LPU is configured to determine which antenna unit among the plurality of antenna units is receiving uplink RF signals from the at least one client device having the greatest signal strength. The LPU is further configured to determine location information for the at least one client device based on identification of the antenna unit receiving the uplink RF signals from the at least one client device having the greatest signal strength.

Embodiments disclosed herein also include apparatuses and methods for determining the location of a mobile terminal in a distributed antenna system (DAS). An additional LPU is coupled to a typical DAS and preferably integrated in the head-end unit. Each RF uplink signal is transmitted to the LPU before being combined together and all of the split downlink signals are sent to the LPU as well. The LPU is communicatively linked to the base station and sends the location information of all distributed antennas to the base station. In order to extract the location information of a mobile terminal, the LPU monitors the usage of the frequency band which follows the long term evolution (LTE) standard.

In accordance with another embodiment, apparatuses for determining the location of a mobile terminal are provided and comprise a distributed antenna system that includes multiple antennas located in an indoor region where each of the antennas is located in a known area and provides a respective coverage area for communicating with a mobile terminal; a head-end unit that distributes the downlink signals and combines the uplink signals; and an LPU that is integrated in the head-end unit and is communicatively linked to the base station. The RF transmission signals in the system are modulated according to the LTE standard.

In accordance with another embodiment, apparatuses for determining the location of a mobile terminal, the location processing unit (LPU), are provided and comprise a plurality of signal monitoring devices that receive each of the uplink signals transmitted by the multiple antennas located in the known areas and acquire the time slots of the downlink signals sent by the base station and split by the head-end unit; and a location server that identifies a transmitting mobile terminal by monitoring the usage of the frequency band and sends the location information to the base station.

In accordance with another embodiment, methods for determining the location of a mobile terminal are provided and comprise selecting a specific time slot from the downlink signals; calculating the received signal strength indication (RSSI) values for each of the resource blocks at the specific time slot from the uplink signals; delivering the RSSI values of all the antennas to the location server of the LPU; and identifying which of the antennas is closest to the transmitting mobile terminal by monitoring RSSI values.

In accordance with one feature in the method for determining the location of a mobile terminal, the signal processing steps include converting the RF signals acquired from both downlink and uplink to baseband by transceivers (TRXs); digitizing the downlink and uplink signals by a pair of analog-to-digital converters (ADCs); selecting the specific window of data samples from the sample streams by time synchronization; and calculating the RSSI values for each of the resource blocks by a fast Fourier transform (FFT).

In according with a modification of embodiments disclosed herein, the location information comprising of the maximum RSSI values with the respective antenna locations where those maximum values have been received are provided to the base station, which then combines this location information with the prior user allocation to provide a location estimate to the network.

In a further modification of the method, the downlink and the uplink RF signals are temporal synchronized by means of standard techniques used in mobile terminal devices.

In another embodiment, the RSSI values for each of the resource blocks (RB) are calculated by an FFT.

In another modification, the location information of the transmitting mobile terminal is sent to the base station. An alternative embodiment of the method is to instruct the mobile device to modulate its output power, to identify a received signal from the mobile device having modulated output power; and to identify a particular antenna unit having a highest received power level from the mobile device.

Another embodiment of the method is provided by using time division multiple access (TDMA) protocol to identify a received signal from the mobile device in a frequency channel and time slot of the mobile device; and to determine which of the antennas is closest to the mobile device to be located by monitoring received signal strength of the identified signal.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 11 is a schematic diagram of an exemplary downlink base station interface card (BIC) that can be provided in the exemplary HEU in FIG. 9A;

FIG. 16 is an exemplary URX message communicated from a URX to an LPU to provide energy levels associated with RAUs assigned to the URX for client device communications to the RAUs;

FIG. 21 is a graph illustrating exemplary time-frequency separation of client devices;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include distributed antenna apparatuses, systems, methods, and computer-readable mediums to provide location information regarding client devices communicating with remote antenna units in a distributed antenna system. Providing location information is also providing "location services." The location information can be used to determine the location of the client devices relative to the remote antenna unit(s) in which the client devices are communicating. In this scenario, the client devices would be known to be within communication range of the remote antenna units. This information can be used to determine or provide a more precise area of location of the client devices. The distributed antenna components and systems, and related methods disclosed herein may be well suited for indoor environments where other methods of providing and/or determining the location of client devices may be obstructed or not possible due to the indoor environment.

In this regard, in certain embodiments disclosed herein, a location processing unit (LPU) configured to provide location information for at least one client device wirelessly communicating in a distributed antenna system can be provided. The LPU includes a control system configured to receive uplink radio frequency (RF) signals communicated by at least one client device wirelessly communicating to a plurality of antenna units. The control system is further configured to determine the signal strengths of the uplink RF signals. The control system is further configured to determine which antenna unit among the plurality of antenna units is receiving uplink RF signals from the at least one client device having the greatest signal strength. The control system is further configured to determine location information for the at least one client device based on identification of the antenna unit receiving the uplink RF signals from the at least one client device having the greatest signal strength.

Figure 3:
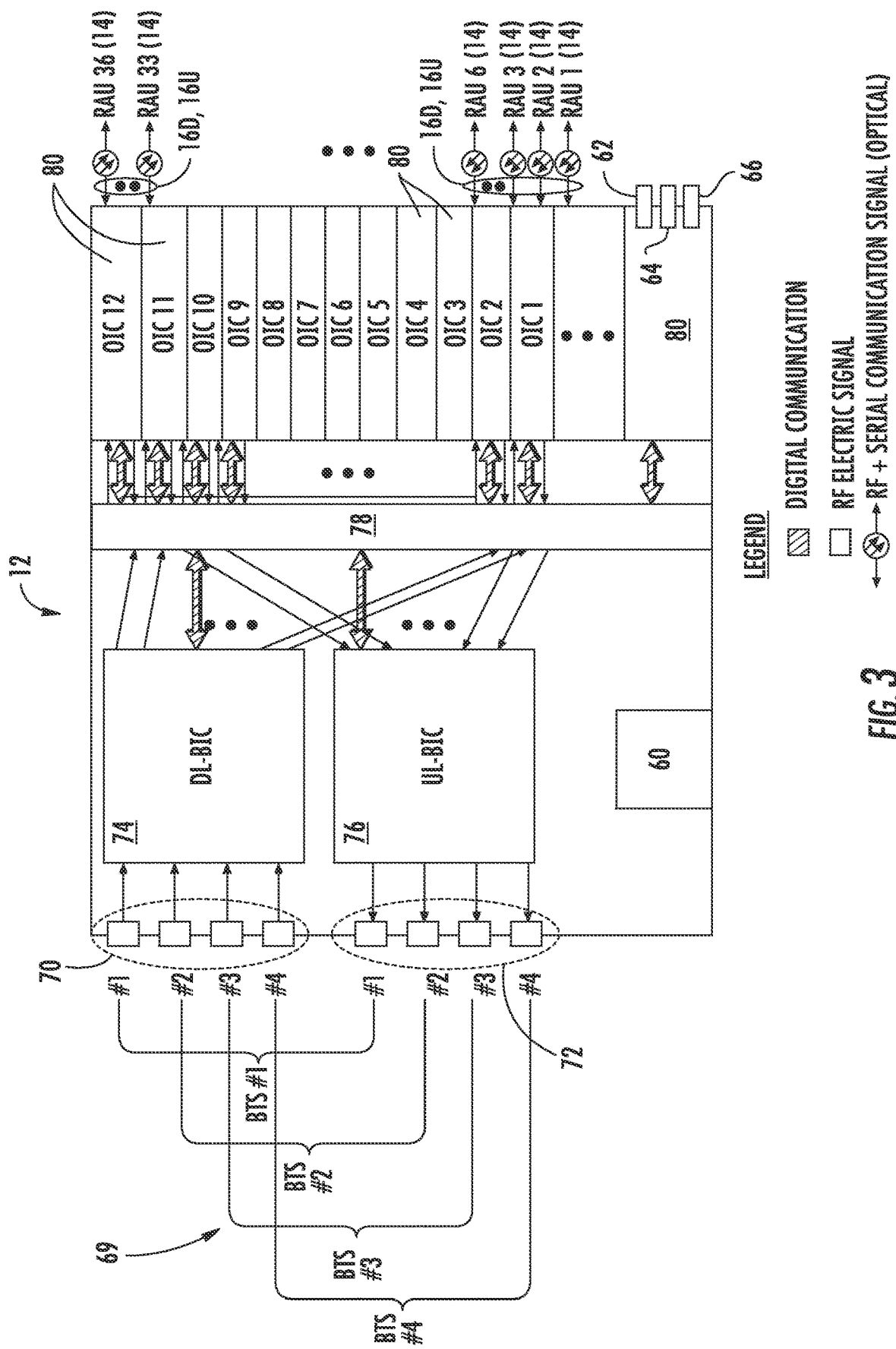
FIG. 3 is an exemplary schematic diagram of an exemplary head-end unit (HEU) deployed in an distributed antenna system.
Figure 4:
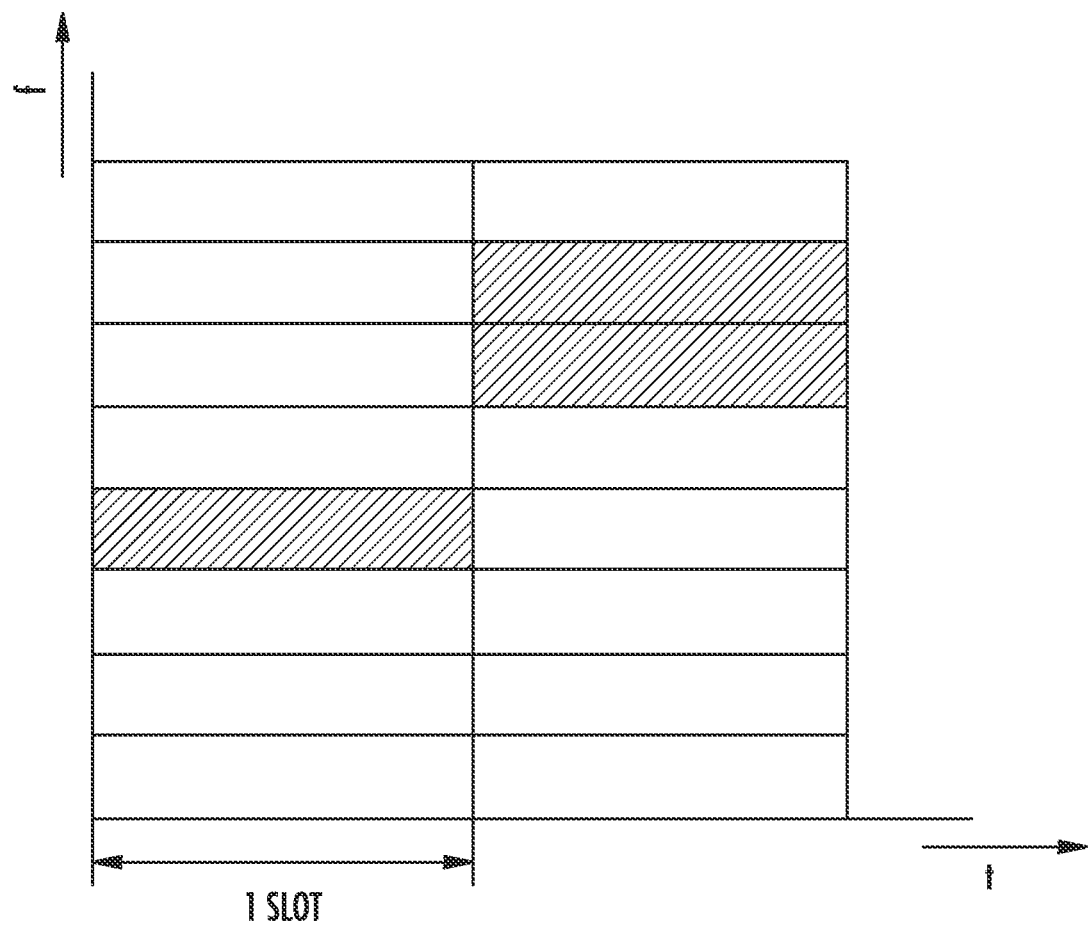
FIG. 4 shows an example of resource allocation in the frequency-time grid, received from a particular remote antenna unit(s) (RAUs) in a distributed antenna system.
Figure 5:
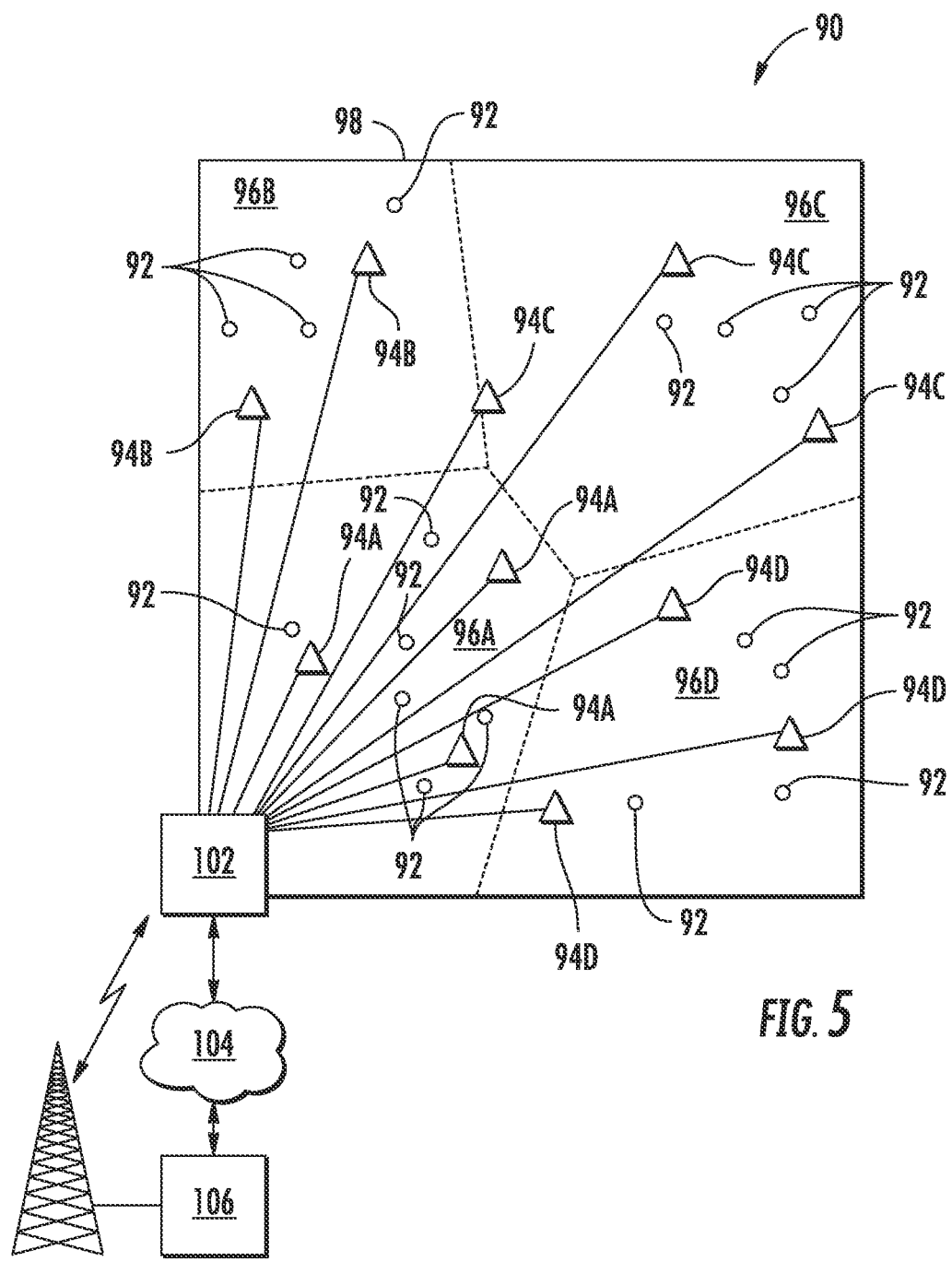
FIG. 5 is a schematic diagram of an exemplary distributed antenna system illustrating location of client devices in relation to their communication with one or more RAUs in the distributed antenna system.

Before discussing the exemplary apparatuses, systems, methods, and computer-readable mediums that are configured to determine location information of a client device(s) in a distributed antenna system starting at FIG. 5, exemplary distributed antenna systems that do not include location processing according to embodiments disclosed herein are first described with regard to FIGS. 1-4.

Figure 1:
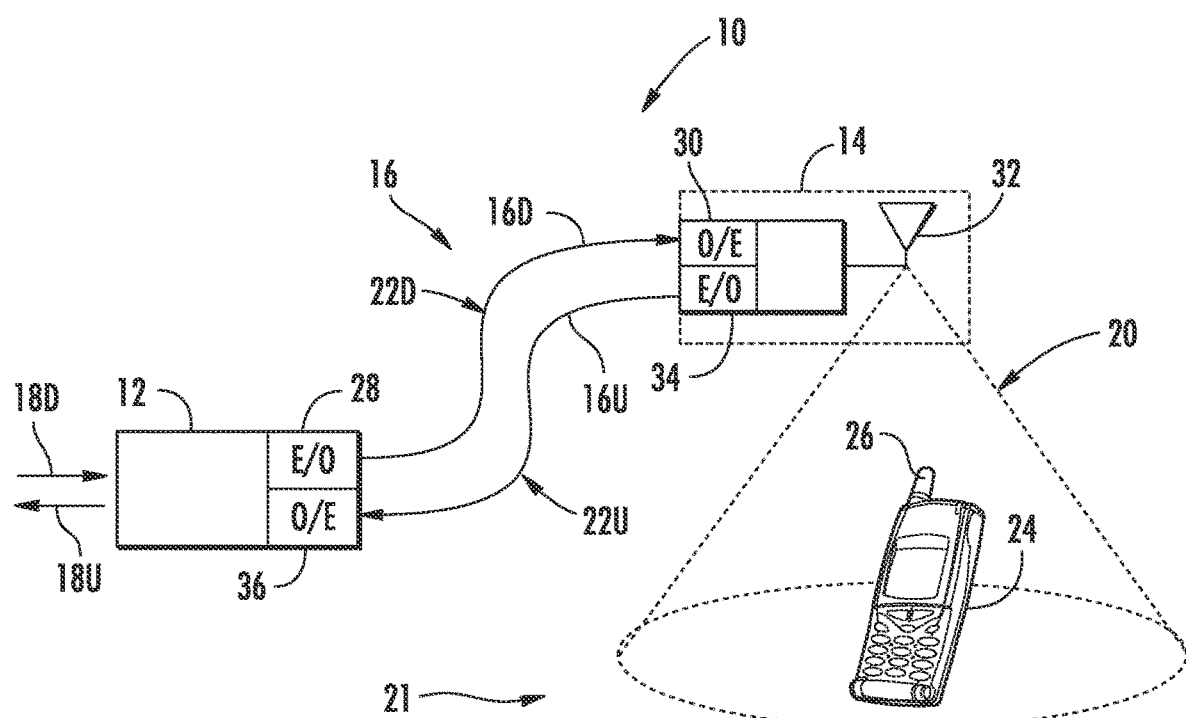
FIG. 1 is a schematic diagram of an exemplary distributed antenna system.

Distributed antenna systems can employ different transmission mediums, including for example, conductive wire and optical fiber. A possible configuration of a distributed antenna system using fiber optic cables is shown in FIG. 1. In this regard, FIG. 1 is a schematic diagram of a generalized embodiment of an antenna system. In this embodiment, the antenna system is a distributed antenna system 10. The distributed antenna system 10 is configured to create one or more antenna coverage areas for establishing communications with wireless client devices located in the radio frequency (RF) range of the antenna coverage areas. In this regard, the distributed antenna system 10 includes a head-end unit (HEU) 12, one or more remote antenna units (RAUs) 14 and an optical fiber link 16 that optically couples the HEU 12 to the RAU 14. The HEU 12 is configured to receive communications over downlink electrical RF signals 18D from a source or sources, such as a network or carrier as examples, and provide such communications to the RAU 14. The HEU 12 is also configured to return communications received from the RAU 14, via uplink electrical RF signals 18U, back to the source or sources. In this regard, in this embodiment, the optical fiber link 16 includes at least one downlink optical fiber 16D to carry signals communicated from the HEU 12 to the RAU 14 and at least one uplink optical fiber 16U to carry signals communicated from the RAU 14 back to the HEU 12.

The distributed antenna system 10 has an antenna coverage area 20 that can be substantially centered about the RAU 14. The antenna coverage area 20 of the RAU 14 forms an RF coverage area 21. The distributed antenna system 10 in this example is an optical fiber-based distributed antenna system. In this regard, the HEU 12 is adapted to perform or to facilitate any one of a number of Radio-over-Fiber (RoF) applications, such as radio-frequency (RF) identification (RFID), wireless local-area network (WLAN) communication, or cellular phone service. "Radio-over-Fiber," or "RoF," utilizes RF signals sent over optical fibers. Shown within the antenna coverage area 20 is a client device 24 in the form of a mobile device as an example, which may be a cellular telephone as an example. The client device 24 can be any device that is capable of receiving RF communication signals. The client device 24 includes an antenna 26 (e.g., a wireless card) adapted to receive and/or send electromagnetic RF signals.

As discussed above, the distributed antenna system 10 may, but is not required to, employ RoF. RoF is a technology whereby light is modulated by a radio signal and transmitted over an optical fiber link to facilitate wireless access. In an RoF architecture, a data-carrying RF signal with a high frequency (e.g. only, greater than 10 GHz) is imposed on a lightwave signal before being transported over the optical link. Therefore, wireless signals are optically distributed to base stations directly at high frequencies and converted to from optical to electrical domain at the base stations before being amplified and radiated by an antenna. As a result, no frequency up/down conversion is required at the various base station, thereby resulting in simple and rather cost-effective implementation is enabled at the base stations.

With continuing reference to FIG. 1, to communicate the electrical RF signals over the downlink optical fiber 16D to the RAU 14, to in turn be communicated to the client device 24 in the antenna coverage area 20 formed by the RAU 14, the HEU 12 includes an electrical-to-optical (E/O) converter 28. The E/O converter 28 converts the downlink electrical RF signals 18D to downlink optical RF signals 22D to be communicated over the downlink optical fiber 16D. The RAU 14 includes an optical-to-electrical (O/E) converter 30 to convert received downlink optical RF signals 22D back to electrical RF signals to be communicated wirelessly through an antenna 32 of the RAU 14 to client devices 24 located in the antenna coverage area 20. The antenna 32 may be referred to as a "remote antenna unit 32" herein, but such only means that the antenna 32 is located a desired distance from the HEU 12.

Similarly, the antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RAU 14. The E/O converter 34 converts the electrical RF signals into uplink optical RF signals 22U to be communicated over the uplink optical fiber 16U. An O/E converter 36 provided in the HEU 12 converts the uplink optical RF signals 22U into uplink electrical RF signals, which can then be communicated as uplink electrical RF signals 18U back to a network or other source. The HEU 12 in this embodiment is not able to distinguish the location of the client devices 24 in this embodiment. The client device 24 could be in the range of any antenna coverage area 20 formed by an RAU 14.

Figure 2:
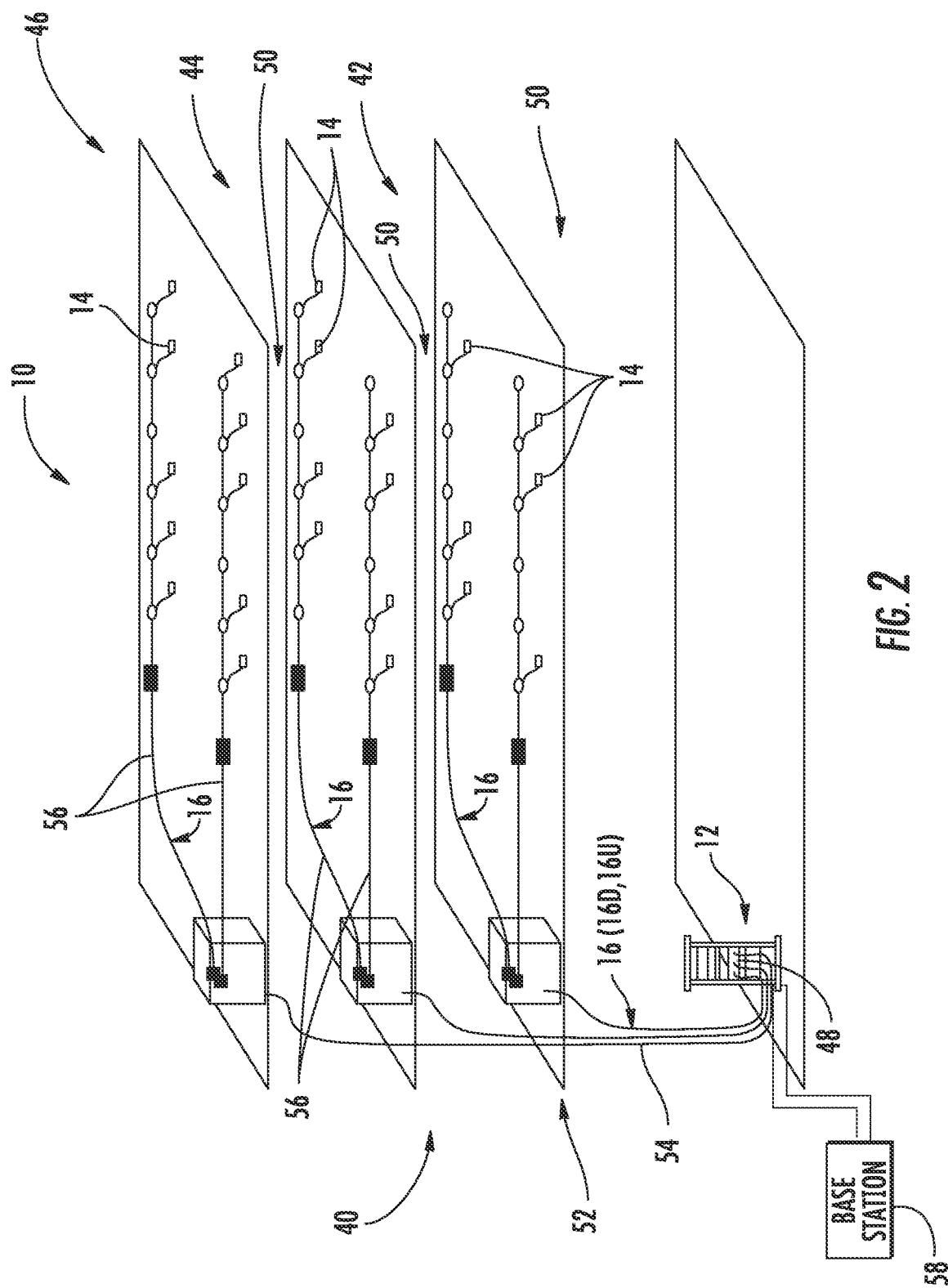
FIG. 2 is a partially schematic cut-away diagram of an exemplary building infrastructure in which a distributed antenna system can be employed.

To provide further exemplary illustration of how a distributed antenna system, such as distributed antenna system 10 in FIG. 1, can be deployed indoors, FIG. 2 is a partially schematic cut-away diagram of a building infrastructure 40 employing the distributed antenna system 10 of FIG. 2. The building infrastructure 40 generally represents any type of building in which the distributed antenna system 10 can be deployed. As previously discussed with regard to FIG. 1, the distributed antenna system 10 incorporates the HEU 12 to provide various types of communication services to coverage areas within the building infrastructure 40, as an example. For example, as discussed in more detail below, the distributed antenna system 10 in this embodiment is configured to receive wireless RF signals and convert the RF signals into RoF signals to be communicated over the optical fiber link 16 to the RAUs 14. The distributed antenna system 10 in this embodiment can be, for example, an indoor distributed antenna system (IDAS) to provide wireless service inside the building infrastructure 40. These wireless signals can include cellular service, wireless services such as radio frequency identification (RFID) tracking, Wireless Fidelity (WiFi), local area network (LAN), and combinations thereof, as examples.

With continuing reference to FIG. 2, the building infrastructure 40 includes a first (ground) floor 42, a second floor 44, and a third floor 46. The floors 42, 44, 46 are serviced by the HEU 12 through a main distribution frame 48 to provide antenna coverage areas 50 in the building infrastructure 40. Only the ceilings of the floors 42, 44, 46 are shown in FIG. 2 for simplicity of illustration. In the example embodiment, a main cable 52 has a number of different sections that facilitate the placement of a large number of RAUs 14 in the building infrastructure 40. Each RAU 14 in turn services its own coverage area in the antenna coverage areas 50. The main cable 52 can include, for example, a riser section 54 that carries all of the downlink and uplink optical fibers 16D, 16U to and from the HEU 12. The main cable 52 can include one or more multi-cable (MC) connectors adapted to connect select downlink and uplink optical fibers 16D, 16U, along with an electrical power line, to a number of optical fiber cables 56.

The main cable 52 enables multiple optical fiber cables 56 to be distributed throughout the building infrastructure 40 (e.g., fixed to the ceilings or other support surfaces of each floor 42, 44, 46) to provide the antenna coverage areas 50 for the first, second and third floors 42, 44 and 46. In an example embodiment, the HEU 12 is located within the building infrastructure 40 (e.g., in a closet or control room), while in another example embodiment the HEU 12 may be located outside of the building infrastructure 40 at a remote location. A base station 58, which may be provided by a second party such as a cellular service provider, is connected to the HEU 12, and can be co-located or located remotely from the HEU 12. A base station is any station or source that provides an input signal to the HEU 12 and can receive a return signal from the HEU 12. In a typical cellular system, for example, a plurality of base stations are deployed at a plurality of remote locations to provide wireless telephone coverage. Each base station serves a corresponding cell and when a mobile station enters the cell, the base station communicates with the mobile station. Each base station can include at least one radio transceiver for enabling communication with one or more subscriber units operating within the associated cell.

To provide further detail on components that can be provided in a HEU, including the HEU 12 provided in the distributed antenna system 10 of FIGS. 1 and 2, FIG. 3 is provided. As illustrated therein, the HEU 12 in this embodiment includes a head-end controller (HEC) 60 that manages the functions of the HEU 12 components and communicates with external devices via interfaces, such as a RS-232 port 62, a Universal Serial Bus (USB) port 64, and an Ethernet port 66, as examples. The HEU 12 can be connected to a plurality of base stations (BTSs) 69(1)-69(N), transceivers, and the like via base station inputs 70 and base station outputs 72. The base station inputs 70 are downlink connections and the base station outputs 72 are uplink connections. Each base station input 70 is connected to a downlink base station interface card (BIC) 74 located in the HEU 12, and each base station output 72 is connected to an uplink BIC 76 also located in the HEU 12. The downlink BIC 74 is configured to receive incoming or downlink RF signals from the base station inputs 70 and split the downlink RF signals into copies to be communicated to the RAUs 14, as illustrated in FIG. 4. The uplink BIC 76 is configured to receive the combined outgoing or uplink RF signals from the RAUs 14 and split the uplink RF signals into individual base station outputs 72 as a return communication path.

The downlink BIC 74 is connected to a midplane interface card 78 panel in this embodiment. The uplink BIC 76 is also connected to the midplane interface card 78. The downlink BIC 74 and uplink BIC 76 can be provided in printed circuit boards (PCBs) that include connectors that can plug directly into the midplane interface card 78. The midplane interface card 78 is in electrical communication with a plurality of optical interface cards (OICs) 80, which provide an optical to electrical communication interface and vice versa between the RAUs 14 via the downlink and uplink optical fibers 16D, 16U and the downlink BIC 74 and uplink BIC 76. The OICs 80 include the E/O converter 28 in FIG. 2 that converts electrical RF signals from the downlink BIC 74 to optical RF signals, which are then communicated over the downlink optical fibers 16D to the RAUs 14 and then to client devices. The OICs 80 also include the O/E converter 36 in FIG. 1 that converts optical RF signals communicated from the RAUs 14 over the uplink optical fibers 16U to the HEU 12 and then to the base station outputs 72.

The OICs 80 in this embodiment support up to three (3) RAUs 14 each. The OICs 80 can also be provided in a PCB that includes a connector that can plug directly into the midplane interface card 78 to couple the links in the OICs 80 to the midplane interface card 78. The OICs 80 may consist of one or multiple optical interface cards (OICs). In this manner, the HEU 12 is scalable to support up to thirty-six (36) RAUs 14 in this embodiment since the HEU 12 can support up to twelve (12) OICs 80. If less than thirty-six (36) RAUs 14 are to be supported by the HEU 12, less than twelve OICs 80 can be included in the HEU 12 and plugged into the midplane interface card 78. One OIC 80 is provided for every three (3) RAUs 14 supported by the HEU 12 in this embodiment. OICs 80 can also be added to the HEU 12 and connected to the midplane interface card 78 if additional RAUs 14 are desired to be supported beyond an initial configuration. The HEC 60 can also be provided that is configured to be able to communicate with the downlink BIC 74, the uplink BIC 76, and the OICs 80 to provide various functions, including configurations of amplifiers and attenuators provided therein. Note that although FIG. 3 illustrates specific exemplary components for the HEU 12, the HEU 12 is not limited to such components.

It may be desired to provide location information/localization services in the distributed antenna system 10 illustrated in FIGS. 1 and 2, as an example. For example, it may be desired determine the location of client devices 24 communicating with antennas 32 in the distributed antenna system 10. Localization services may be desired or required to provide certain services, such as, for example, emergency 911 (E911) services in the case of a cellular client device. Localization services may require a certain percentage of client devices 24 to be locatable within a given distance to comply with communication requirements. As an example, it may be desired or required by E911 services to be able to locate a given percentage of all client device users within one hundred (100) feet (ft.) as an example. Localization services may be desired or required for other types of wireless clients other than cellular clients as well. If client devices 24 are located inside the building infrastructure 40 and establishes communication with the HEU 12, it can be determined that the client devices 24 are located within at least the distance between the farthest RAU 14 located from the HEU 12. However, it may not be possible to determine the location of client devices 24 with greater specificity and resolution. For example, in indoor environments, global positioning services (GPSs) provided in the client devices 24 may be inoperable to report a location. Further, triangulation techniques as a method of determining location of client devices 24 may not be possible due to separation of the antenna coverage areas in the distributed antenna system 10.

If it could be determined to which RAU(s) 14 in the distributed antenna system 10 a client device 24 establishes communications, this information could be used to provide location information for a client device 24. The client device 24 would be known to be within communication range of such RAU(s) 14. This information coupled with knowing the location of the HEU 12 can be used to determine or provide a more precise area of location of the client device 24. In essence, linking communication of client devices 24 with a particular RAU(s) 14 provides another layer of location determination in addition to knowing the location of the HEU 12. Cellular networks, for example, provide methods of determining location.

For example, Global System for Mobile Communications (GSM) network compatible client devices are configured to automatically initiate providing client device identification information over the network that can be exploited to provide location services for a distributed antenna system. The locations of the RAUs in the system are also configured and known in the HEU. By knowing and correlating the particular RAU(s) in which the client device established communication, the HEU is able to determine and/or provide the location of the client device as being within the antenna coverage area formed by the particular RAU. The correlation of client device identification information from the client device with the location of the RAU is retained when communicated to the HEU and is not lost by being combined, such as by splitters or containers, with communications from other RAUs.

As another example, in a code division multiple access (CDMA) network, a specific notification channel is provided to carry a tracking signal that can be exploited to provide location services in a distributed antenna system. In this manner, the tracking signal is radiated through the RAU to be communicated to client devices within range of the antenna coverage area formed by the RAU. When the client device wirelessly receives the tracking signal, the client device communicates its identification information and identification of the tracking signal to an RAU to be communicated back to the HEU. The HEU can provide this information to a network or carrier. In this manner, the client device identification information and identification of the tracking signal can be associated with the location of a particular RAU(s) that received and transmitted the tracking signal in the distributed antenna system to provide or determine a location of the client device.

As another example, the long term evolution (LTE) standard supports both frequency division duplexing (FDD) and time division duplexing (TDD) modes that can be exploited to provide location services in a distributed antenna system. LTE uses orthogonal frequency-division multiplexing (OFDM) for the downlink and a pre-coded version of OFDM called single carrier-frequency division multiple access (SC-FDMA) for the uplink. Furthermore, LTE employs a multiple input/multiple output (MIMO) antenna scheme to achieve the requirements of throughput and spectral efficiency. The LTE standard supports both FDD and TDD modes. In the time domain, the time slot is fixed to 0.5 milliseconds (ms) long which is half of a subframe. A radio frame is ten (10) ms long and it contains ten (10) subframes. In the frequency domain, the smallest resource unit is denoted as a resource element and twelve of these elements together (per slot) are called a resource block (RB) that is 180 kiloHertz (kHz). Uplink and downlink transmissions are separated in the frequency domain. For TDD mode, a subframe is either allocated to downlink or uplink transmission. Uplink and downlink transmissions alternate in the time domain using the same frequency bands.

In this regard, FIG. 4 illustrates that in an uplink, data is allocated in multiples of one resource block. In FDD applications, the uplink resource block size in the frequency domain contains twelve (12) sub-carriers and the transmission time interval is one (1) ms long. The uplink resource blocks are assigned to the user equipment (UE) by the base station scheduler, which is called evolved Node B (eNB). Since the base station assigns certain time (t) and frequency (f) blocks to the UEs and informs UEs about the transmission format to use, the base station has complete knowledge of which user has used a specific frequency bin at a specific time slot. The UEs may hop resource blocks RB from subframe to subframe. In LTE PUSCH hopping mode, a UE may even use different frequencies from one slot to another for added frequency diversity. FIG. 4 shows an exemplary diagram of resource allocation in the frequency-time grid, received from a particular antenna in the distributed antenna system. As shown in FIG. 4, the UE hops to another frequency allocation from one slot to another within one subframe.

Since there is a growing demand for increasing the capacity and speed of mobile telecommunication networks, mobile communication technology is currently being developed toward the 4th generation (4G), which is mainly based on the LTE standard. Therefore, it is desired to provide a method for determining the location of a mobile terminal in a distributed antenna system that can meet the LTE standard.

In each of these technologies and any others that may be selected for employment in a distributed antenna system, if communications between client devices and particular RAU(s) can be determined and recognized, the location of the client devices in the distributed antenna system can be determined. Depending on the communication technologies employed or supported in a distributed antenna system, how a particular RAU is linked to a particular client device can vary, but the concept of linking particular RAU(s) to client devices to determine location can be employed.

In this regard, FIG. 5 illustrates a schematic diagram of an exemplary distributed antenna system 90 that is configured to provide localization services for locating particular client devices 92 communicating with RAUs 94A-94D within the distributed antenna system 90. In this example, the RAUs 94A-94D are strategically located within different tracking zones 96A-96D in a building 98 or other infrastructure. For example, FIG. 5 illustrates four tracking zones 96A-96D, which may each represent a given floor within the building 98. Note that although four (4) tracking zones 96A-96D are shown, the disclosure herein is not limited to providing a particular number of tracking zones. Thus, when the client devices 92 are located within range of a particular RAU 94A-94D, the client device 92 will communicate with a particular RAU(s) 94A-94D in range.

With continuing reference to FIG. 5, an HEU 102 provided in the distributed antenna system 90 and communicatively coupled to the RAUs 94A-94D can receive communications from the client devices 92 and determine from which RAU(s) 94A-94D communications from the client devices 92 are being received. Thus, location information regarding the client devices 92 can be determined based on linking communications of the client devices 92 to known locations of the RAUs 94A-94D in the distributed antenna system 90. The location information can be provided by the HEU 102 over a wired and/or wireless network 104 to a base station 106, if desired. The base station 106 may contain information that allows the client devices 92 to be specifically identified by user or subscriber to then know the location of such user or subscriber.

Figure 6:
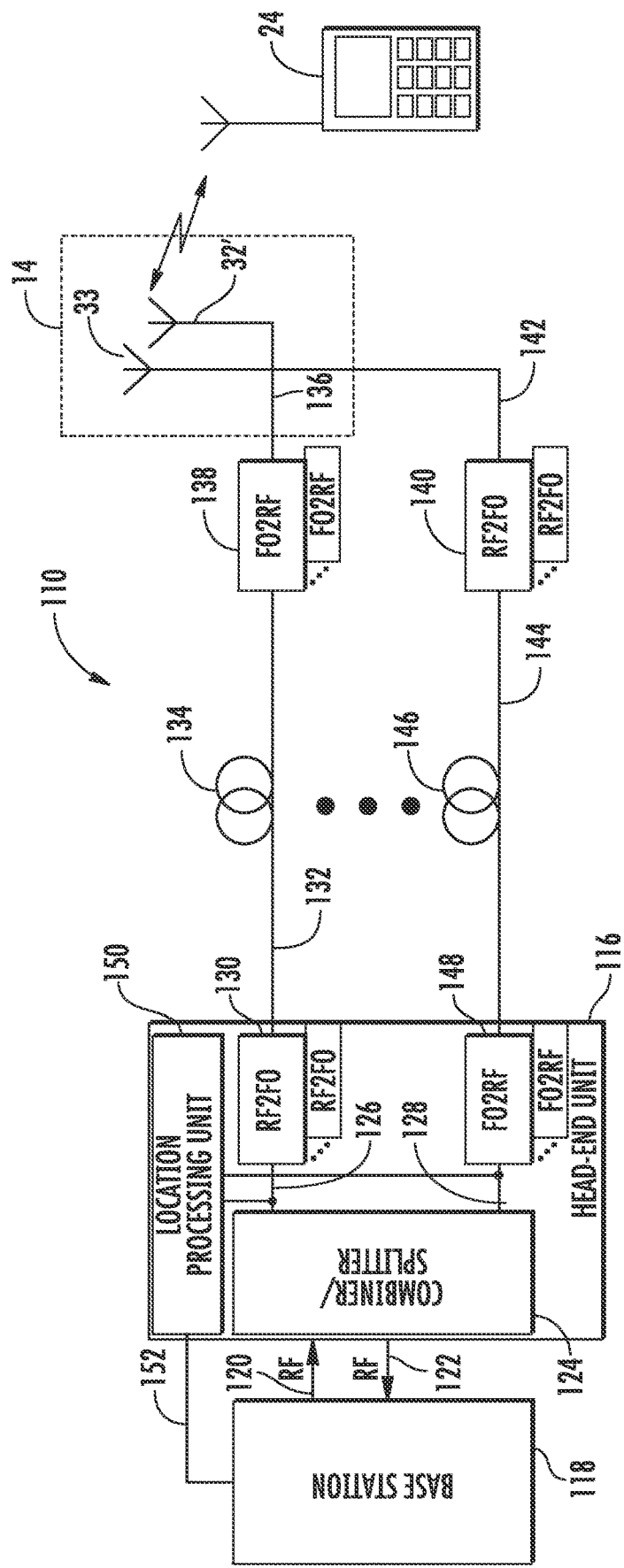
FIG. 6 is a schematic diagram of a distributed antenna system integrated with a location processing unit (LPU) in accordance with one embodiment.

Embodiments disclosed herein include modified HEUs that provide exemplary solutions to locate client devices based on their communications with a particular RAU(s) in a distributed antenna system. In this regard, FIG. 6 provides one embodiment of determining the location of a client device in a distributed antenna system. As illustrated therein, a distributed antenna system 110 is provided, which in this example is an optical fiber-based distributed antenna system. The distributed antenna system 110 contains multiple antennas 32 provided in remote antenna units (RAU) 14 that provide respective coverage areas for communicating with client devices 24, which may be for example cellular devices and/or terminals. A main antenna 32 and an auxiliary antenna 32' may be provided for antenna diversity. A HEU 116 is provided that is communicatively coupled to a base station 118, which may be a cellular base station, to receive input electrical RF signals 120 from the base station 118 and provide output electrical RF signals 122 to the base station 118.

The HEU 116 includes a combiner/splitter 124 that splits the input electrical RF signals 120 into downlink electrical RF signals 126. A plurality of RF-to-FO (RF2FO) converters 130 are provided to convert the downlink electrical RF signals 126 to downlink optical RF signals 132. The downlink optical RF signals 132 are transmitted in an indoor region via fiber optic cables 134 and converted back to downlink electrical RF signals 136 by a plurality of FO-to-RF (FO2RF) converters 138. The converted downlink electrical RF signals 136 are further transmitted to the multiple antennas 32 for communicating with the client devices 24. A plurality of RF2FO converters 140 are also provided to convert uplink electrical RF signals 142 from the client devices 24 to uplink optical RF signals 144. The uplink optical RF signals 144 are communicated over fiber optic cables 146 to FO2RF converters 148 at the HEU 116 to be converted into uplink electrical RF signals 128. The combiner/splitter 124 combines the uplink electrical RF signals 128 into the output electrical RF signals 122 communicated to the base station 118.

If the client device 24 sends an RF signal to any of the antennas 32 in this embodiment, the base station 118 cannot identify the location of the client device 24. This is because the uplink electrical RF signals 128 from the various client devices 24 are combined by the combiner/splitter 124. Thus, in this embodiment, a location processing unit (LPU) 150 is provided and integrated into the HEU 116. As will be described in more detail below, the LPU 150 can determine the location of the client devices 24. In certain embodiments, the LPU 150 can determine the location of the client devices 24 by monitoring the signal strength of the uplink electrical RF signals 142 received from the client devices 24. By monitoring the signal strength of the uplink electrical RF signals 142 (either by direct measurement or indirectly such as measuring the signal strength of the uplink optical RF signals 144) the LPU 150 can determine with which antenna 32 in the distributed antenna system 110 the client device 24 is communicating. If the client device 24 is communicating with multiple antennas 32, the LPU 150 can distinguish which antenna 32 is closest to the client device 24 by comparing the signal strengths of the uplink electrical RF signals 142 received by the multiple antennas 32. The LPU 150 can then provide this location information regarding the client device 24 to the base station 118 via a communication link 152, which may be a wired or wireless link.

Figure 7:
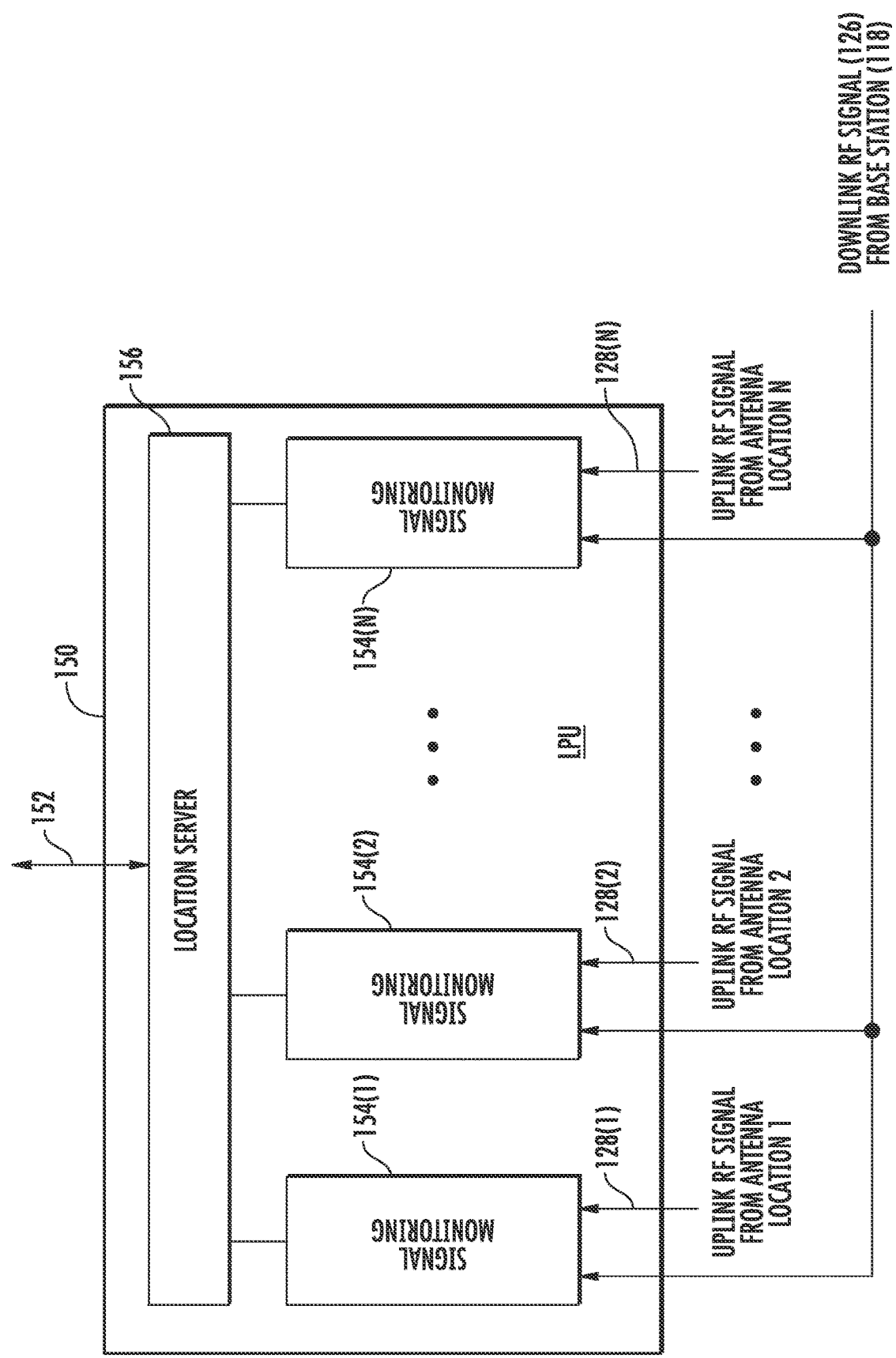
FIG. 7 is a schematic diagram illustrating more detail of the internal components of an exemplary LPU, which may include the LPU of FIG. 6.

FIG. 7 is a schematic diagram of one possible embodiment of the LPU 150 in FIG. 6. In this regard, a plurality of signal monitoring devices 154(1)-154(N) receive the uplink electrical RF signals 128(1)-128(N) from each of the distributed antennas 32 located in the known areas before being combined together by the HEU 116 and acquire the time slots of the downlink electrical RF signals 126 sent by the base station 118 after being split by the HEU 116. The task of the signal monitoring devices 154(1)-154(N) is to provide the usage of the frequency band from each of the multiple antennas 32 (see FIG. 6). For each of the uplink electrical RF signals 128(1)-128(N), the received signal strength indication (RSSI) value is determined by the signal monitoring devices 154(1)-154(N) for given time/frequency blocks. A location server 156 receives RSSI values of all of the antennas sent by the signal monitoring devices 154(1)-154(N) and identifies which of the antennas 32 is closest to the transmitting client device 24 to be located. The location information is then sent over the communication link 152 to the base station 118. Since the base station 118 controls the assignment of certain time slot/frequency blocks to the client devices 24 in this embodiment, the base station 118 can uniquely identify which of the client devices 24 has used a specific frequency bin at a specific time slot.

In case of an emergency or a service request sent by the client device 24, the base station 118 is asked to deliver the location information and it sends the request to the LPU 150. Then, the LPU 150 acquires RSSI values for all particular time slots/frequency blocks from all the antennas and identifies the location of the transmitting client device 24 by identifying the antenna 32 for which the resource block (RB) energy is maximized. The location information is then sent from the LPU 150 to the base station 118 over the communication link 152. An assessment of these RSSI values (e.g., triangulation) provides a good estimation of the location in which the client device 24 is sending the service request by monitoring the usage of the frequency band, and it is communicatively linked to the base station 118.

Figure 8:
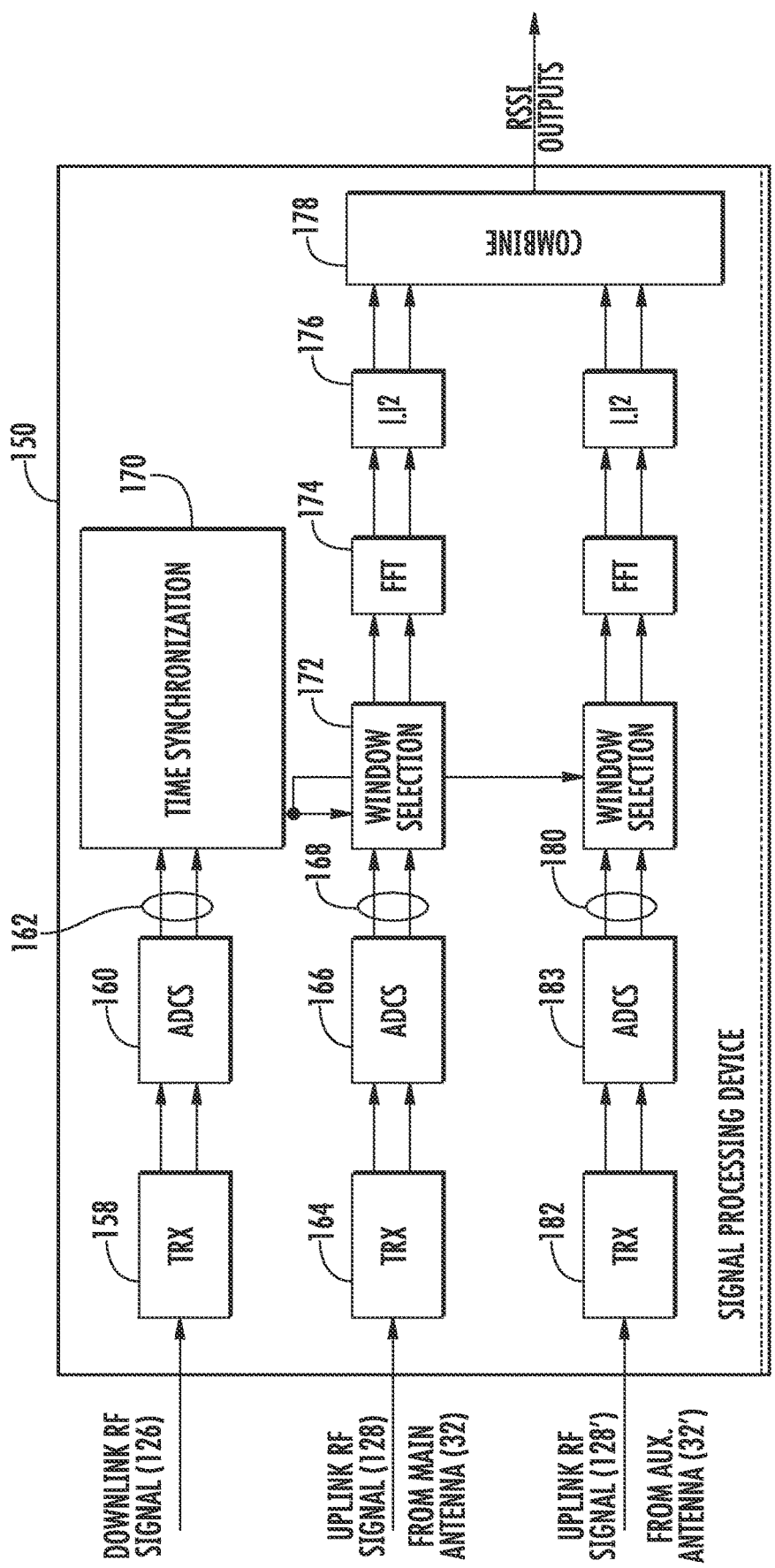
FIG. 8 is a schematic diagram illustrating exemplary signal processing steps that can be performed by an LPU, including the LPU in FIGS. 6 and 7, to provide location processing and location services.

FIG. 8 is a schematic diagram illustrating exemplary signal processing steps that can be performed by an LPU, including the LPU 150 in FIGS. 6 and 7, to provide location processing and location services for locating client devices. The signal processing is performed in the LPU 150 for antenna diversity, for example, when two receiving antennas 32, 32' per antenna location are employed for communications to the client device 24. The downlink electrical RF signal 126 is first down-converted to baseband by means of a transceiver (TRX) 158 that includes at least mixers and appropriate filters. The downlink electrical RF signal 126 is then digitized by a pair of analog-to-digital converters (ADCs) 160 to produce downlink data 162.

With continuing reference to FIG. 8, the uplink electrical RF signal 128 received from the main antenna 32 at a specific location is converted to digital baseband by a TRX 164 and ADCs 166 to produce uplink data 168. Time synchronization 170 of the downlink data 162 and the uplink data 168 is processed by means of standard techniques that are also employed in client devices 24. For a given time slot (as illustrated in FIG. 4), the signal from the time synchronization 170 is used in a window selection 172 to select a specific window of data samples from the sample streams to process a fast Fourier transform (FFT) 174. The squared absolute value of each FFT output is computed in step 176 and the relevant outputs are combined to form an RSSI value for the given time slot/frequency block in step 178.

Optionally, a second received uplink electrical RF signal 128' coming from an auxiliary antenna 32' at the same antenna location can be processed in the same manner. Uplink data 180 of this second path consisting of a TRX 182 and ADCs 183 are then combined together with the RSSI outputs of the main receiving antenna 32 in step 178 and this combined RSSI value can provide a better location estimation.

In an alternative embodiment applicable to TDD mode, in which uplink and downlink transmissions alternate in the time domain using the same frequency bands, a switching mechanism can be used to alternate the downlink and uplink transmissions on the same frequency. However, the downlink time synchronization block must additionally assess the control information about the downlink and uplink periods. In LTE, this control information can be retrieved from one of the control channels from the downlink. An additional signal needs to be generated and conveyed to the uplink signal processing paths to exclude downlink signals from being processed. Alternatively, a signal provided by the base station that is used to control a power amplifier in a TDD system can be used instead.

Figure 9A:
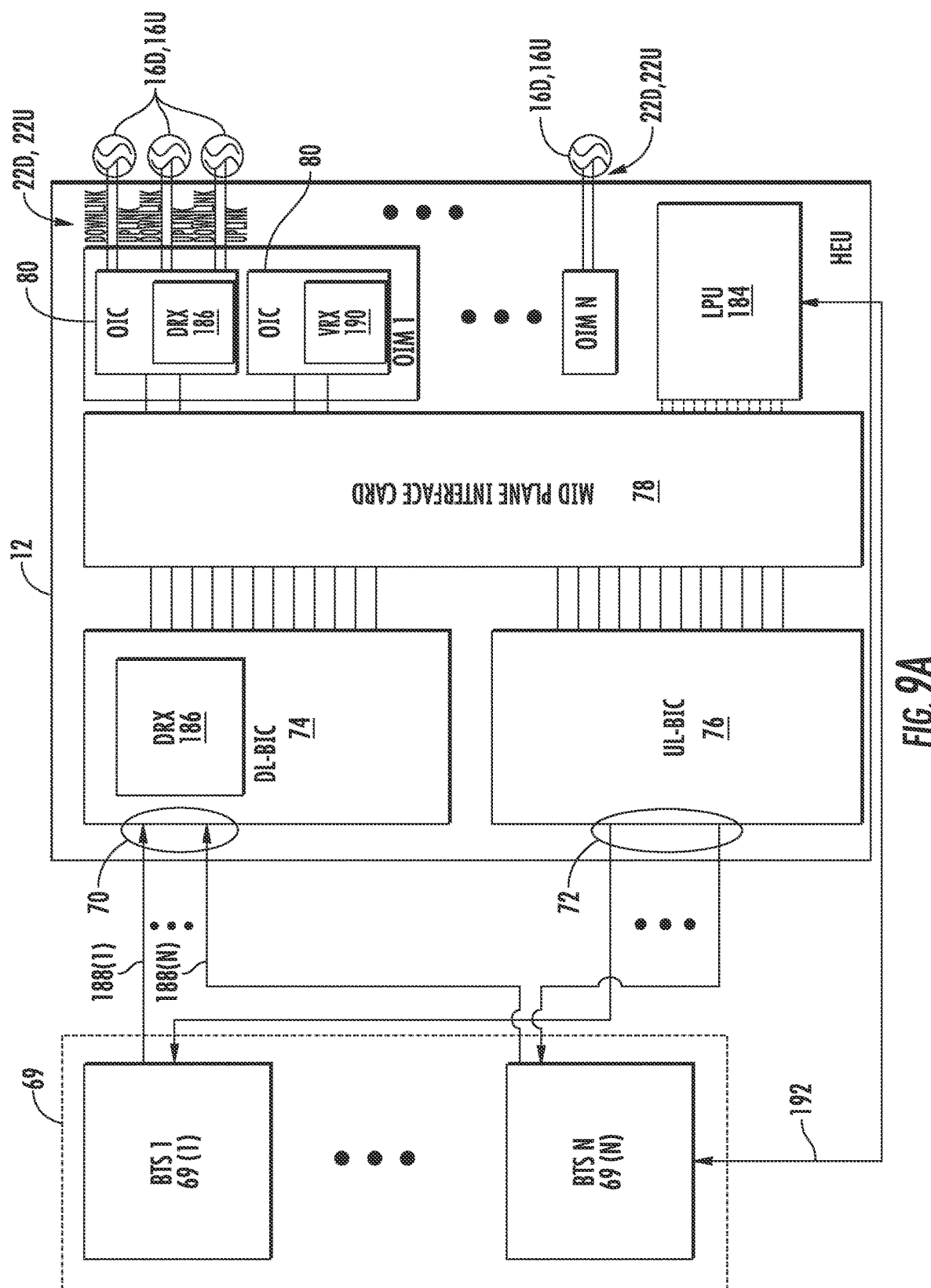
FIG. 9A is a schematic diagram of the HEU in FIG. 3 that includes an LPU and other components to determine location of client devices in a distributed antenna system.
Figure 9B:
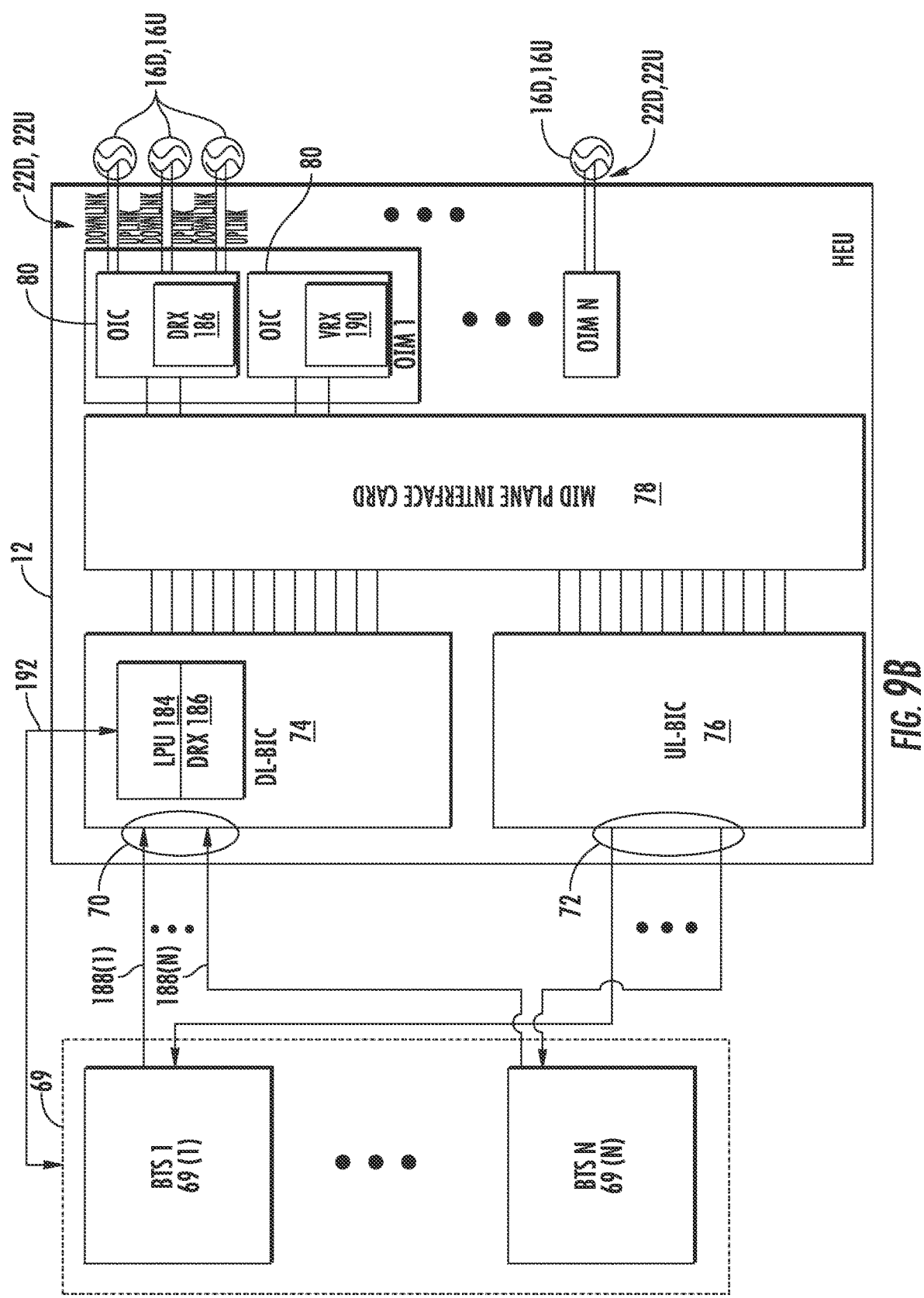
FIG. 9B is a schematic diagram of an alternative HEU that includes a co-located LPU and downlink receiver (DRX)

Now that generalized embodiments of providing location services have been described, more specific exemplary embodiments are discussed. In this regard, FIG. 9A is a schematic diagram of the HEU 12 in FIG. 3 that includes another example of an LPU and other components to determine location of client devices in a distributed antenna system. Components in FIG. 7 that are common with components in FIG. 3 are illustrated with common element numbers and thus will not be re-described here. To provide location information, an LPU 184 is provided in the HEU 12 and is interfaced with other additional components provided in the HEU 12. In FIG. 9A, the LPU 184 is provided as a separately component from a digital receiver (DRX) 186, which is discussed in more detail below. Alternatively, as illustrated in FIG. 9B, the LPU 184 and DRX 186 may be co-located in the same component, for example on the same PCB. The LPU 184 is the main interface to the base stations 69(1)-69(N) via communication links 192. The base stations 69(1)-69(N) can request location processing services over the communication links 192 to the LPU 184. In response, the LPU 184 can configure a downlink receiver (DRX) 186 and uplink receivers (URXs) 190, which are described in more detail below. The URXs 190 provide a distributed configuration to provide information regarding energy levels of the uplink optical RF signals 22U resulting from client device 24 communications to antennas at RAUs 14 coupled to the HEU 12 to the LPU 184. The LPU 184 uses the energy levels to determine which antenna 32 (i.e., RAU) is closest to the client device 24 to perform location services. More detail regarding internal exemplary components of the LPU 184 is provided in FIG. 10 described below.

With continuing reference to FIG. 9A, the DRX 186 is provided to retrieve specific settings from a downlink control channel sent by a base station 69(1)-69(N) over downlink electrical RF signals 188(1)-188(N) from the base station 69(1)-69(N). These settings are sent to the LPU 184 for analysis and control generation for analyzer functions performed by the LPU 184 for determining location of the client devices 24. The DRX 186 uses the downlink electrical RF signals 188(1)-188(N) to synchronize a local oscillator. The DRX 186 also provides a reference frequency and reference timing to the LPU 184 and the uplink receivers (URXs) 190 (which are discussed below) to synchronize these components to the base station 69(1)-69(N). One DRX 186 can be provided in the HEU 12 providing settings to the LPU 184 and all URXs 190. Alternatively, a DRX 186 can be provided for each OIC 80 if desired. More detail regarding an exemplary DRX will be discussed in more detail below with regard to FIGS. 11 and 12.

With continuing reference to FIG. 9A, the URXs 190 are provided to perform signal analysis on uplink optical RF signals 22U received from antennas in RAUs 14 to provide the energy levels of these signals to the LPU 184 for processing. In essence, the URXs 190 listen on the uplink optical fiber 16U to monitor the uplink optical RF signals 22U to determine the energy level of these signals. In this embodiment, each URX 190 has three (3) uplink signal analyzing paths to support three (3) uplink optical RF signals 22U coming from up to three (3) RAUs 14. Implementing URX 190 functionality on the OIC 80 automatically takes into account the scalability of the HEU 12 so that sufficient resources are provided to timely analyze incoming uplink optical RF signals 22U. Each analyzing path converts a specific channel that matches the channel of a base station 69(1)-69(N) to baseband and then performs spectral analysis and energy detection for each RAU 14, respectively. The signal analysis performed in the URXs 190 is made according to the reference timing provided by the DRX 186. The maximum energy values of each channel are provided to the LPU 184 to determine the locations of client devices 24 and provide this information to the base stations 69(1)-69(N). More detail regarding an exemplary URX will be discussed in more detail below with regard to FIGS. 13-15.

With continuing reference to FIG. 9A, the communication link 192 may be an Ethernet communication link, which is well supported. Different network protocols, such as User Datagram Protocol (UDP) and Transmission Control Protocol (TCP)/Internet Protocol (IP) (TCP/IP), are also well supported. IP packets communicated from the LPU 184 to the base stations 69(1)-69(N) can also be routed via a wide area network (WAN) or via a cellular modem (e.g., LTE), as examples, to remote locations. In this manner, location processing provided by the LPU 184 can be supported even if the HEU 12 is remotely located from the base stations 69(1)-69(N), for example, when the HEU 12 is connected to a cellular network.

The base stations 69(1)-69(N) can request location processing services to the HEU 12 by sending a request message over the communication link 192 to the HEU 12. In this instance, the LPU 184 wakes up the DRX 186 and the URXs 190. Control messages from the LPU 184 to the DRX 186 request the DRX 186 to tune to the same channel as the base station 69(1)-69(N) requesting location services/information. The DRX 186 then acquires the base station 69(1)-69(N) downlink signal and decodes the control channel to get frame timing and cell-site specific configuration. These parameters are communicated from the DRX 186 to the LPU 184, which in turn configures the URXs 190 based on this parameter information. The URXs 190 can then monitor the uplink optical RF signals 22U on the configured channel for providing energy levels of uplink optical RF signals 22U on the channel to the LPU 184. If a common DRX 186 is provided, location services can be provided for one channel requested by the base station 69(1)-69(N) at one time. However, if multiple DRXs 186 are provided in the OICs 80, location services for more than one base station channel can be performed at the same time.

Figure 10:
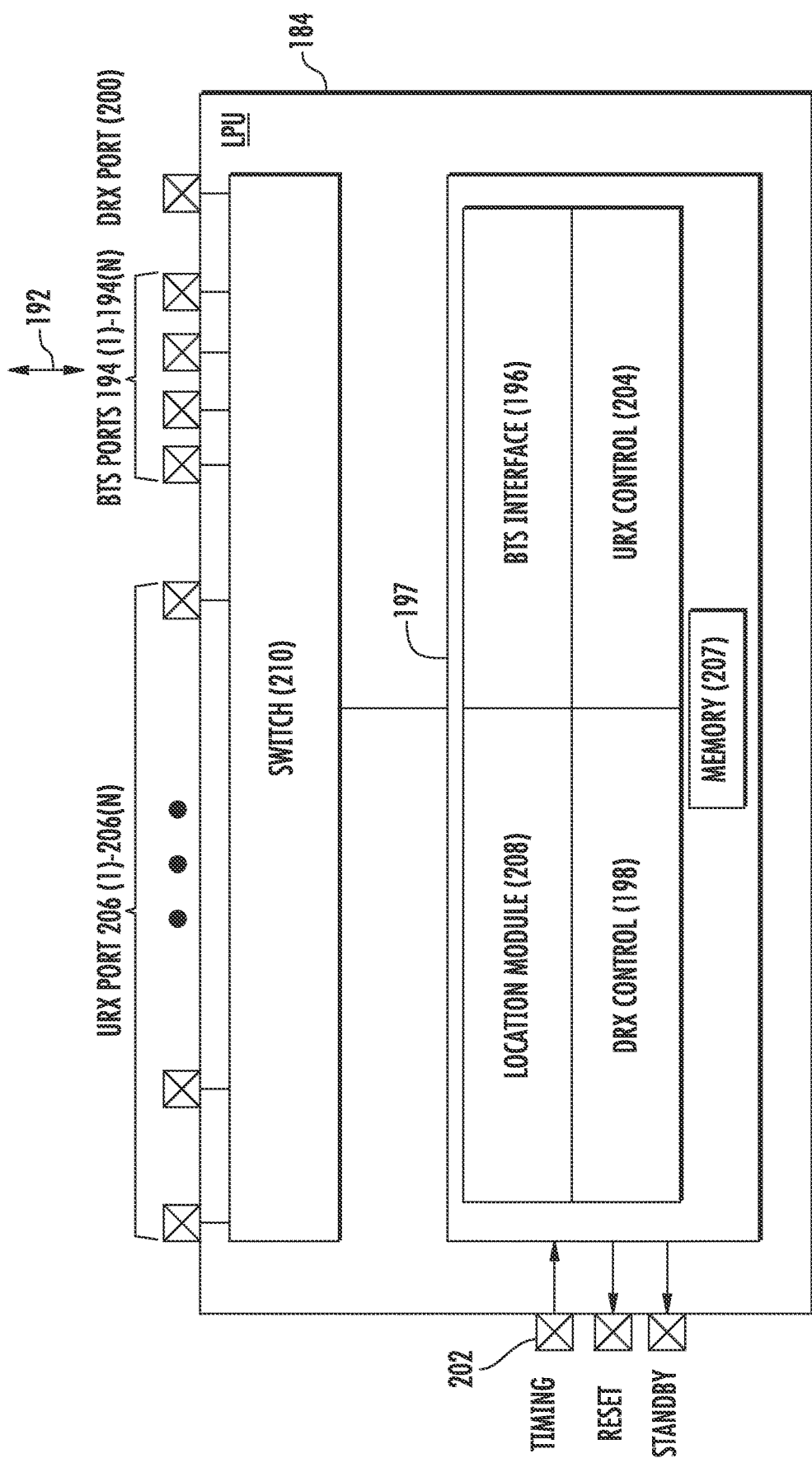
FIG. 10 is a schematic diagram illustrating components that may be included in an LPU, including the LPU in FIGS. 6, 9A, and 9B.

FIG. 10 is a schematic diagram illustrating components that may be included in an LPU, which can include the LPU

184 in FIGS. 6, 9A, and 9B. The LPU 184 in this embodiment includes one or more BTS ports 194(1)-194(N) that allow communication between the LPU 184 and the base stations 69(1)-69(N) over the communication link 192. The BTS ports 194(1)-194(N) are connected to a BTS interface 196 provided in a control system 197 in the LPU 184 that is configured to receive requests to determine locations of client devices 24 for given channels of the base stations 69(1)-69(N). The BTS interface 196 is also configured to report to the base stations 69(1)-69(N) through the appropriate BTS port 194(1)-194(N) which antenna 32 is receiving maximum energy from client devices 24 for determining the location of the client devices 24.

With continuing reference to FIG. 10, the LPU 184 also includes a DRX control 198 that is configured to power up and reset the DRX 186 when location services are requested or desired. The DRX control 198 is also configured to set the channel in the DRX 186 to distinguish downlink RF signals from the base station 69(1)-69(N) requesting location services to the LPU 184. The DRX control 198 communicates to the DRX 186 in this regard through a DRX port 200 provided in the LPU 184. Timing information from the DRX 186 received over a downlink RF signal from a base station 69(1)-69(N) requesting location services is provided to the LPU 184 through a timing port 202.

With continuing reference to FIG. 10, the LPU 184 also includes a URX control 204 that is configured to power up and reset the URXs 190 when location services are requested or desired. The URX control 204 is also configured to set the channel in the URXs 190 to distinguish uplink RF signals from the client devices 24 destined for the base stations 69(1)-69(N) requesting location services to the LPU 184. The URX control 204 can also relay timing information, such as frame number and frame timing, to the URXs 190. The URX control 204 can also relay cell-site specific configuration data, such as cyclic prefix mode and bandwidth as examples, to the URXs 190. The URX control 204 communicates to the URXs 190 in this regard through URX ports 206(1)-206(N) provided in the LPU 184.

With continuing reference to FIG. 10, the LPU 184 also includes a location module 208 that is configured to collect data regarding energy levels of uplink RF signals from the URXs 190 over the URX ports 206(1)-206(N). Thus, the LPU 184 can receive energy levels of uplink RF signals from client devices 24 per URX 190 and per client device 24 since a URX 190 is provided per OIC 80 in one embodiment. The location module 208 identifies the antenna 32 (i.e., RAU 14) that has the maximum energy signal for each client device 24. By selecting the URX 190 that has reported the maximum energy level for a given client device 24, the client device 24 can be associated with a specific antenna 32 in a RAU 14 and thus the location of the client device 24 relative to the location of such antenna 32 can be determined. The location information determined by the location module 208 can be provided to the base stations 69(1)-69(N) via the BTS ports 194(1)-194(N). The LPU 184 includes a switch 210, which may be an Ethernet switch, that concentrates traffic between the components of the LPU 184 and the ports 194(1)-194(N), 200, 206(1)-206(N).

The control system 197, and any of the components provided therein as illustrated in FIG. 10, may be exclusively provided in circuitry, software instructions executing on a processor, or a combination of both. As examples, the control system 197 may include a circuit, which may be provided in a field-programmable gate array (FPGA), a microprocessor, a microcontroller, or any combination thereof. Memory 207 may be provided in the control system 197 that contains computer-executable instructions to perform some or all of the functionalities provided in the control system 197.

FIG. 11 is a schematic diagram of an exemplary downlink BIC 74 in FIGS. 9A and 9B, which can comprise a single printed circuit board. The downlink BIC 74 receives the downlink electrical RF signals 188(1)-188(N) from the base stations 69(1)-69(N), combines the downlink electrical RF signals 188(1)-188(N) via a combiner 212, and then splits the combined signal into twelve (12) output signals to be communicated to the OICs 80 to be converted into downlink optical RF signals to be communicated to RAUs 14. In this embodiment, the DRX 186 is coupled to an output 214 of the combiner 212. As an example, the expected power level of the output 214 may be in the range of 8 dBm. However, as an example, the DRX 186 may be configured to receive signal levels from the output 214 from −10 to −90 dBm. Thus, the DRX 186 can receive downlink electrical RF signals 188(1)-188(N) for all base stations 69(1)-69(N) and thus communicate requests from the base stations 69(1)-69(N) requesting location services to the LPU 184. Alternatively, multiple DRXs 186 could be provided to individually receive downlink electrical RF signals 188(1)-188(N) from the base stations 69(1)-69(N) before the downlink electrical RF signals 188(1)-188(N) are combined. In this instance, each DRX would communicate to the LPU 184 to provide requests for location services from the base stations 69(1)-69(N).

Figure 12:
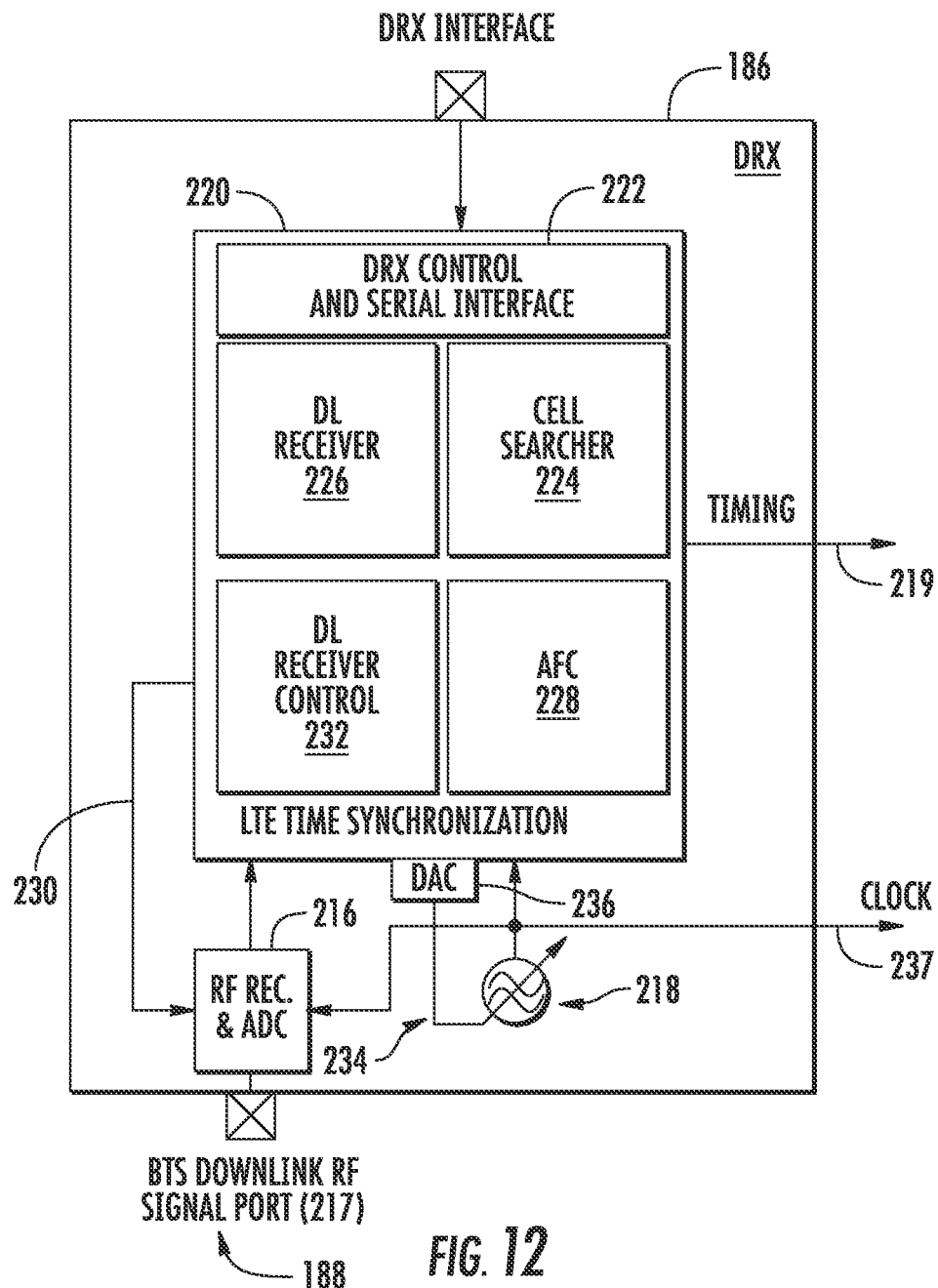
FIG. 12 is a schematic diagram of an exemplary DRX that can be provided in the exemplary HEU in FIGS. 9A and 9B.

FIG. 12 is a schematic diagram of the DRX 186 in FIGS. 9A and 9B illustrating exemplary components that can be provided in the DRX 186. In this example, the DRX 186 contains an RF transceiver 216, a clock generation unit 218, and a control module 220 which provides the logic for performing time synchronization via generation of a TIMING signal 219. For example, the time synchronization performed may be LTE time synchronization. The RF transceiver 216 receives the downlink electrical RF signal 188(1)-188(N) through a BTS downlink RF signal port 217. The control module 220 may be provided exclusively in circuitry, such as in an FPGA as an example, or software executed on a processor, or a combination of both. A DRX control 222 provided in the control module 220 is configured to interpret commands from the LPU 184 and send the detected cell-site specific parameters to the LPU 184. For LTE processing as an example, an LTE cell searcher 224 and downlink receiver 226 are included. Automatic frequency control (AFC) 228 is also included.

Using LTE processing as a specific example, the downlink receiver 226 is set up and calibrated. A control interface 230 to set up and calibrate the RF transceiver 216 is provided by a downlink receiver control 232. The LTE cell searcher 224 finds the frame timing using an LTE primary synchronization sequence (PSS) and secondary synchronization sequence (SSS). The downlink receiver 226 is responsible for retrieving further control parameters from the broadcast channel in the downlink electrical RF signals 188(1)-188(N). Frequency synchronization can be achieved by tuning a local voltage controlled oscillator (VCO) 234. An external digital-to-analog converter (DAC) 236 is provided and used for generating the control voltage for the VCO 234. The URXs 190 are synchronized in frequency to the uplink electrical RF signals received from the client devices 24. Thus, the VCO's 234 reference frequency is buffered and distributed to the URXs 190 as the CLOCK signal 237 in this embodiment. The VCO's 234 reference frequency can also be provided to the LPU 184 for synchronization if the LPU 184 is not hosted on the same PCB as the DRX 184.

Figure 13:
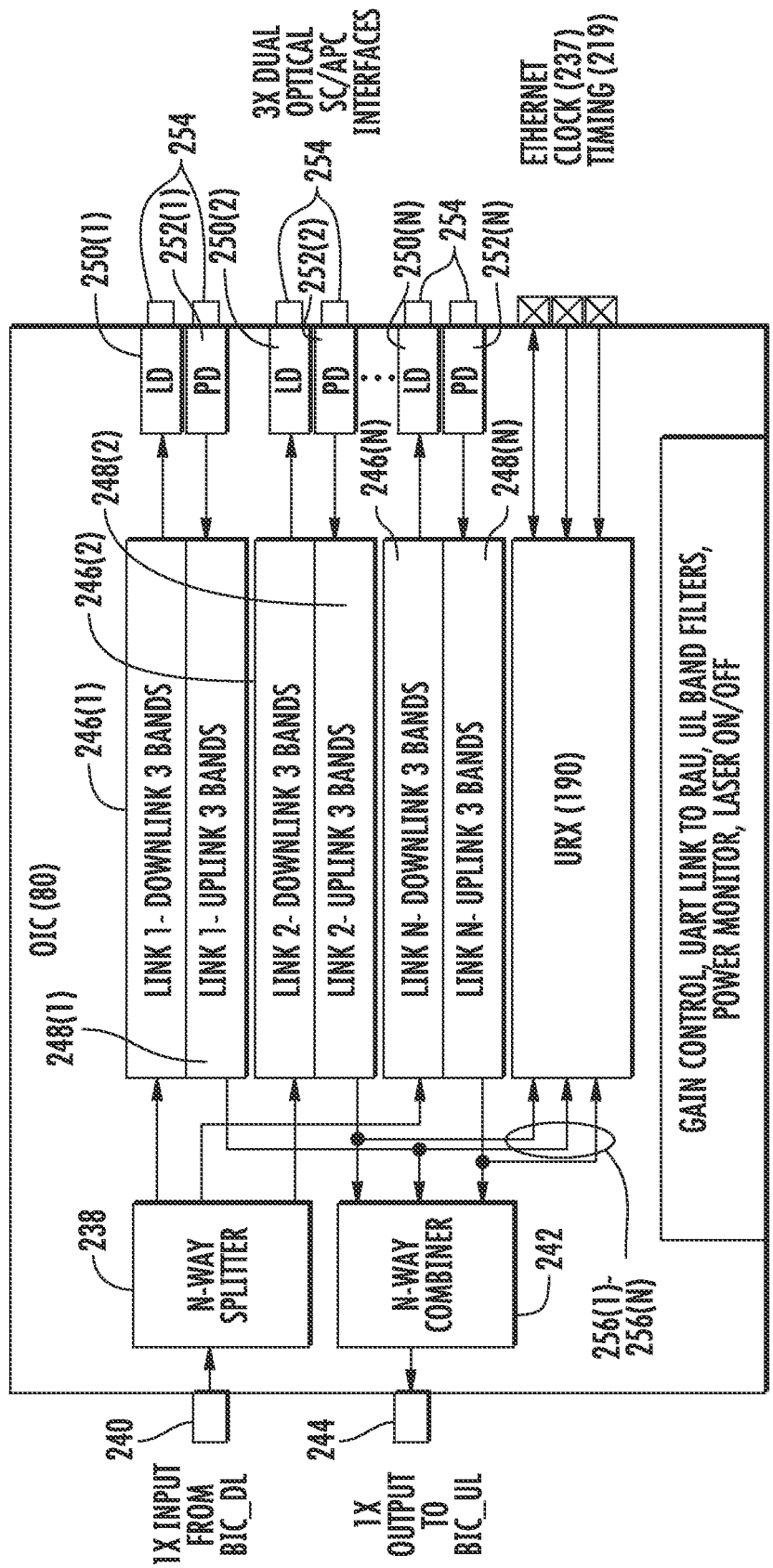
FIG. 13 is a schematic diagram of an exemplary uplink BIC that can be provided in the exemplary HEU in FIGS. 9A and 9B.

FIG. 13 is a schematic diagram of an exemplary OIC 80 provided in FIGS. 9A and 9B. In this embodiment, the OIC 80 supports N number of RAUs 14 on a single PCB. The OIC 80 comprises an N-way downlink splitter 238 electrically coupled to a downlink coaxial connection 240, an N-way uplink combiner 242 electrically coupled to an uplink coaxial connection 244, N downlinks 246(1)-246(N), N uplinks 248(1)-248(N), N E/O converters 250(1)-250(N), N O/E converters 252, and connectors 254. Note that the number of RAUs 14 supported by the OIC 80 can be varied, however, depending upon the particular application. In the illustrated embodiment, the connectors 254 are dual SC/APC interfaces. A URX 190 is provided in the OIC 80 to tap off uplink optical RF signals 256(1)-256(N) that are the output of the N-way uplink combiner 242 to further process such signals and provide energy levels to the LPU 184 for location processing.

Figure 14:
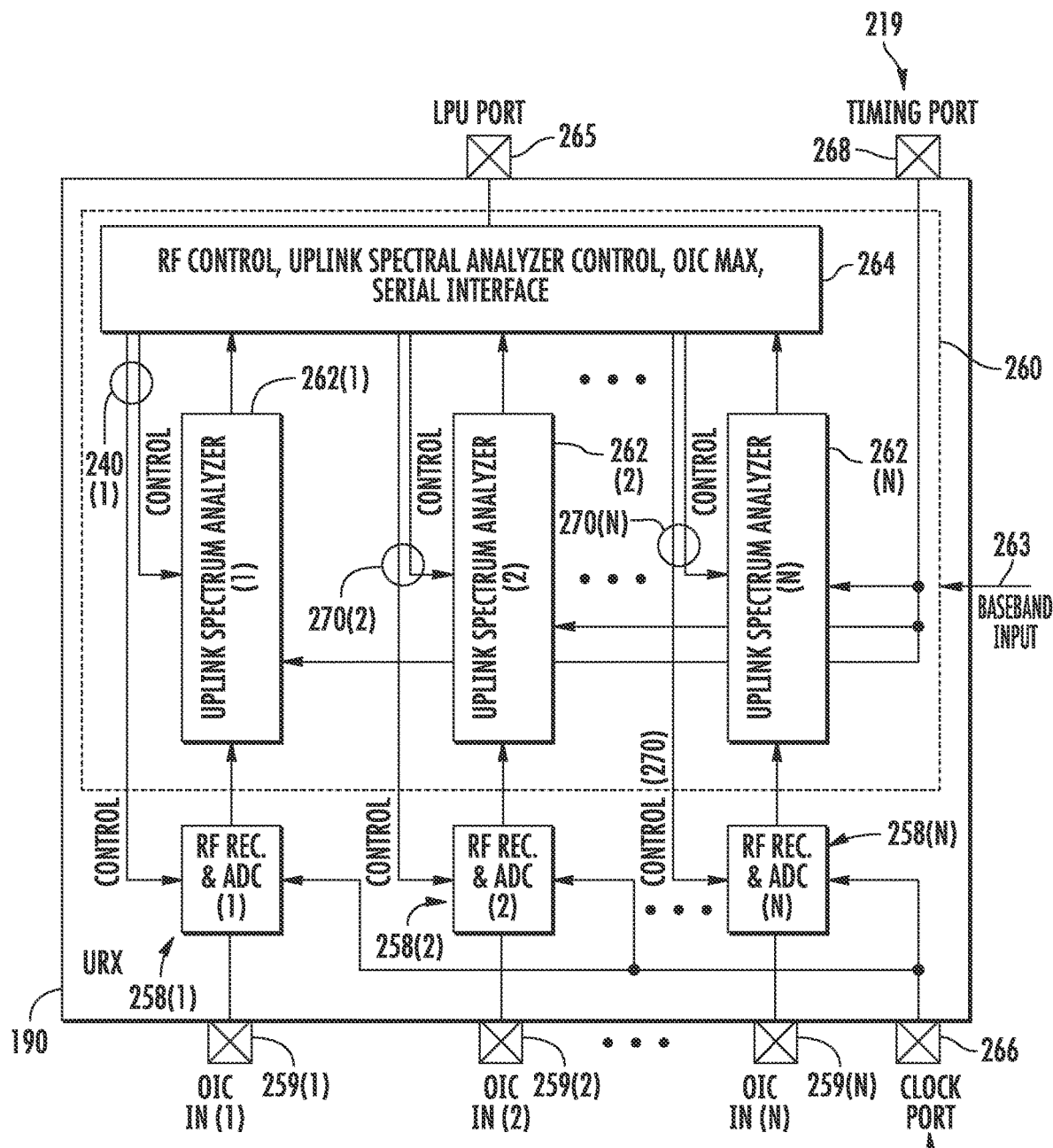
FIG. 14 is a schematic diagram of an exemplary uplink receiver (URX) that can be provided in the exemplary HEU in FIGS. 9A and 9B.

FIG. 14 is a schematic diagram of the URX 190 in FIGS. 9A and 9B illustrates exemplary components provided in the URX 190. In this embodiment, the URX 190 has transceivers 258(1)-258(N), one for each OIC input 259(1)-259(N) supported by the URX 190, which down-converts an uplink electrical RF signal from a client device 24 to baseband. A control module 260 is provided that contains uplink spectrum analyzers 262(1)-262(N) for each OIC input 259(1)-259(N). The uplink spectrum analyzers 262(1)-262(N) perform signal analysis on a digital baseband input 263 to determine the energy level on the uplink electrical RF signals on the baseband. A control interface 264 is provided in the control module 260 to provide energy level information regarding uplink electrical RF signals received from the OIC inputs 259(1)-259(N) to the LPU 184 via an LPU port 265. The uplink spectrum analyzers 262(1)-262(N) can be configured via control signals 270(1)-270(N) provided by the control interface 264 to the uplink spectrum analyzers 262(1)-262(N). The URX 190 receives the clock signal 237 from the DRX 186 through a clock port 266 to use to synchronize control logic in the control module 260. For accurate timing, the uplink spectrum analyzers 262(1)-262(N) receive the timing signal 219 through a timing port 268.

Figure 15:
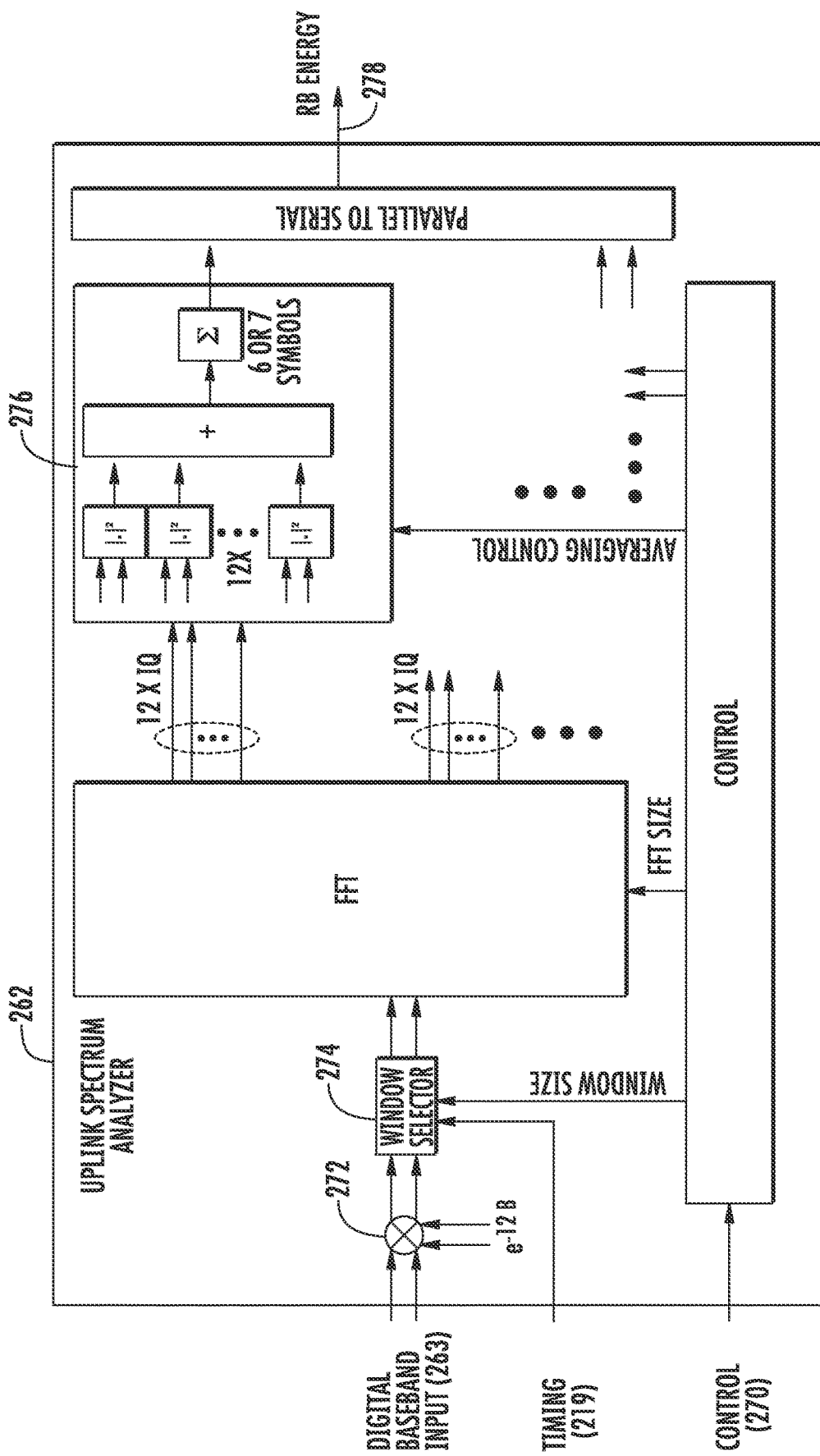
FIG. 15 is a schematic diagram of an exemplary uplink spectrum analyzer provided in the URX in FIG. 14.

FIG. 15 is a schematic diagram of an exemplary uplink spectrum analyzer 262 provided in the URX 190 in FIG. 14. The uplink spectrum analyzer 262 performs signal analysis on one digital baseband input 263 to determine signal strength based on a digital representation of an uplink electrical RF signal. The uplink spectrum analyzer 262 in this embodiment multiplies the digital baseband input 263 with a complex sinusoid signal using a multiplier 272, and the half sub-carrier frequency shift of the uplink electrical RF signal is undone. In order to determine the energy or signal strength level in the uplink electrical RF signal, windowing is performed by a window selector 274. On this sample vector, the FFT is computed. Then, for all used frequencies, the squared absolute value is computed and all squared values that belong to a client device 24 are added. The results are further averaged over a number of symbols 276 that belong to one slot in the example of LTE processing. The results are then serialized and provided as output 278 to the control interface 264.

FIG. 16 illustrates exemplary URX communication messages 280(1)-280(N) communicated from the URX 190 to the LPU 184 to provide energy/signal strength levels associated with RAUs 14 assigned to the URX 190. In this manner, as previously described, the LPU 184 can determine for which RAU the energy level of communications of a client device 24 is strongest. This information can indicate the location of the client device 24, since the location of the RAUs 14 in the distributed antenna system are known. The URX communication messages 280(1)-280(N) are created by the control interface 264 in the URX 190 in the example of FIG. 14 based on the output of the uplink spectrum analyzers 262(1)-262(N).

As illustrated in FIG. 16, each URX 190 provides a URX communication message 280 to the LPU 184. The URX communication message 280 is provided over the LPU port 265 in FIG. 14 to the LPU 184 in one embodiment. For each RAU 14 receiving communications with a client device 24, a URX communication message 280 is provided to the LPU 184. The URX communication message 280 contains a URX ADDRESS 282, FRAME NUMBER 284, and SLOT #286. In one embodiment of LTE processing, this is known as a resource block (RB). An RB 288 contains the energy level for a client device 24 communicating with an RAU. In a LTE processing example, RBs 288 are provided for all LTE resources blocks.

Figure 17:
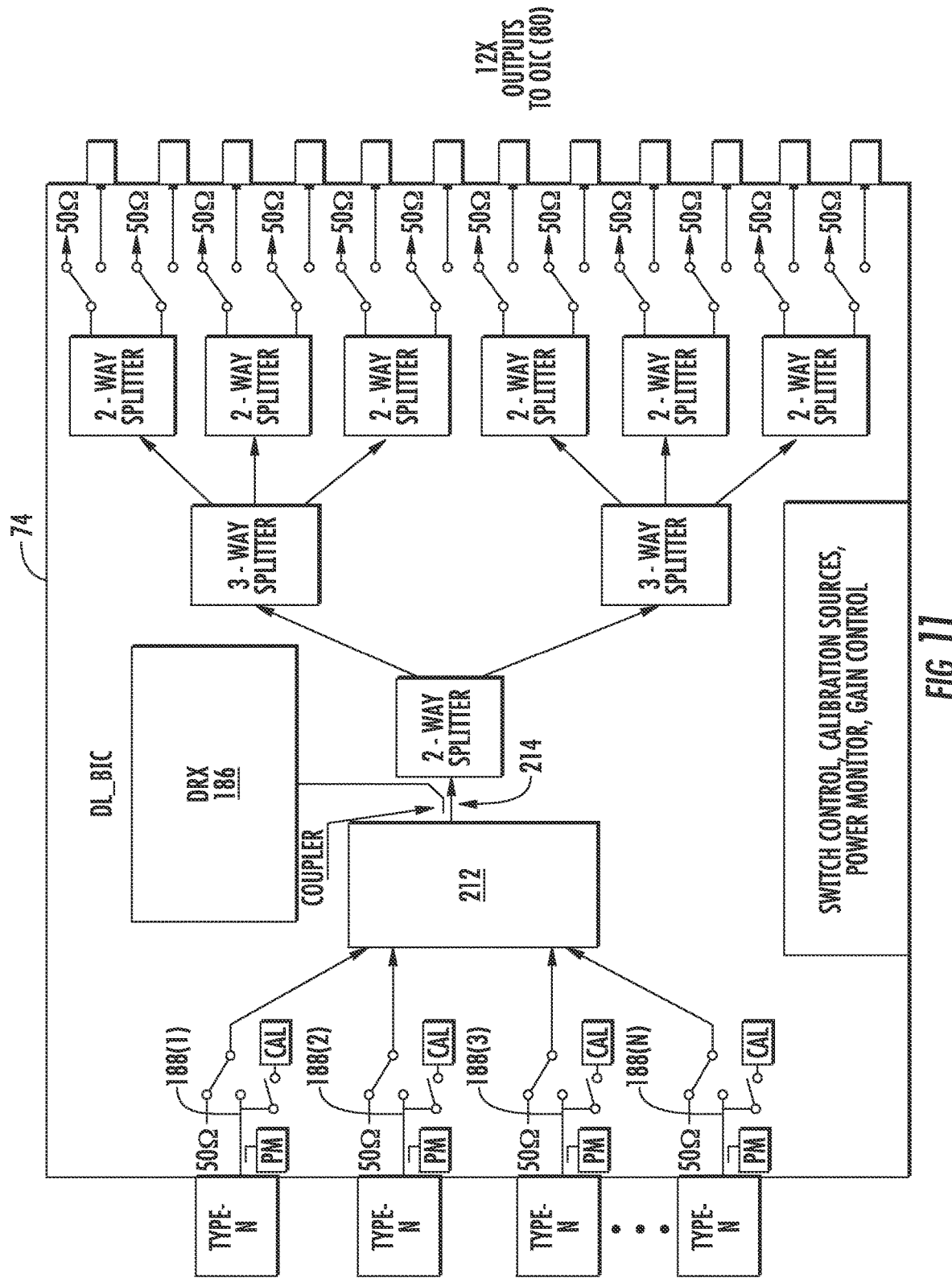
FIG. 17 is an exemplary LPU message communicated from an LPU to a base station to provide RAUs associated with the maximum energy level for client device communications.

FIG. 17 is an exemplary LPU communication message 290 communicated from an LPU 184 to a base station 69(1)-69(N) to provide RAUs associated with the maximum energy level for client device 24 communications. In this example, the location module 208 in the LPU 184 in FIG. 10 creates the LPU communication message 290 to send to a base station 69(1)-69(N) through BTS ports 194 over the communication link 192. The LPU communication message 290 provide condensed information from the URX communication messages 280(1)-280(N) that provide the RB 288 containing the RAU that received the maximum energy level of communications from client devices 24, or RBs. Thus, when this information is provided the base station 69(1)-69(N), the base station 69(1)-69(N) can determine to which RAU the client devices 24 are closest, and thus the location of the client devices 24.

Figure 18:
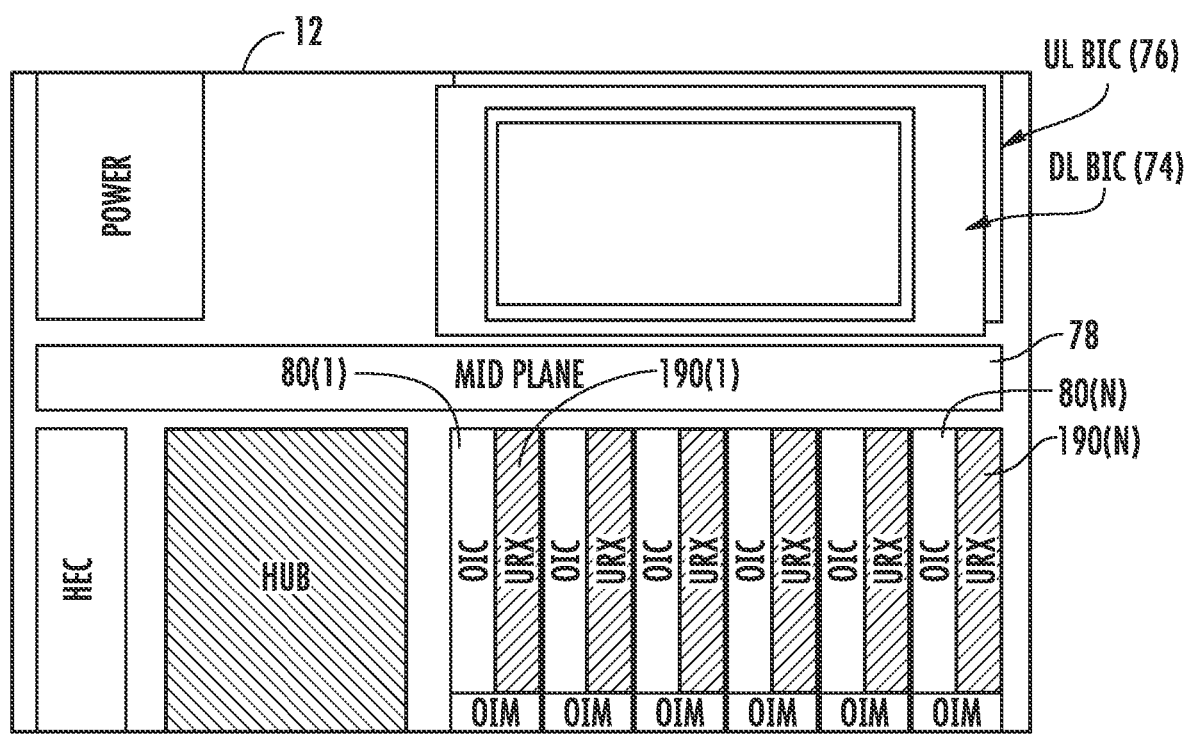
FIG. 18 is a schematic diagram of an exemplary HEU board configuration.

FIG. 18 is a schematic diagram of an exemplary HEU board configuration that can be provided in the HEU 12. In this embodiment, one URX 190 is provided per OIC 80 as illustrated in FIG. 18. This configuration has the advantage of modularity, but also requires more URXs 190 as OICs 80 are added, thereby increasing expense and the space requirements. Thus, in this example, if the URX 190 consumes the same amount of space in the HEU 12 as the OIC 80, providing a URX 190 per OIC 80 reduces the number of OICs 80 that can be provided in the HEU 12 by one half.

Figure 19:
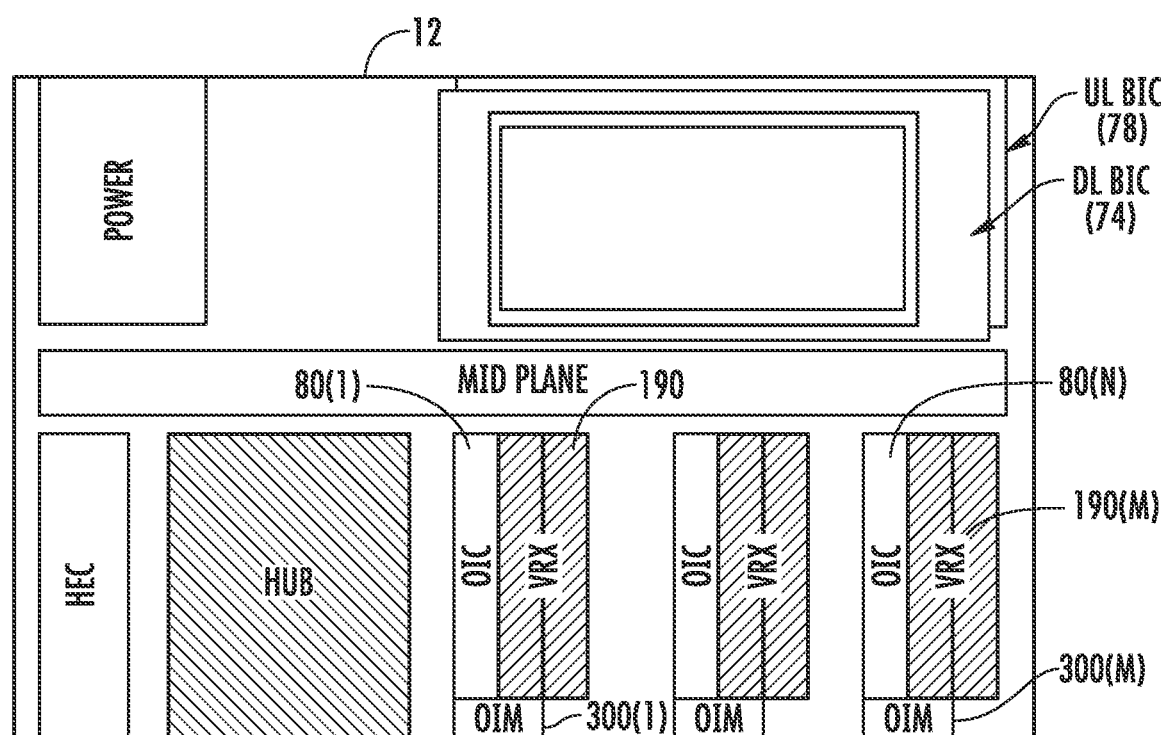
FIG. 19 is a schematic diagram of another exemplary HEU board configuration.

FIG. 19 is a schematic diagram of another exemplary HEU board configuration. In this example, a URX 190 is provided per optical interface module (OIM) 300. An OIM 300 consists of two or more OICs 80. Thus, in this example, less URXs 190 are provided for a given number of OICs 80 than the configuration in FIG. 18. This has the advantage of saving space when a large number of OICs 80 are included in the HEU 12. However, if a small number of OICs 80 are included in the HEU 12, the URX 190 may be more expensive since it provides resources in the URX 190 to support a plurality of OICs 80 in the OIM 300 instead of just one OIC 80 like provided in FIG. 18.

Figure 20:
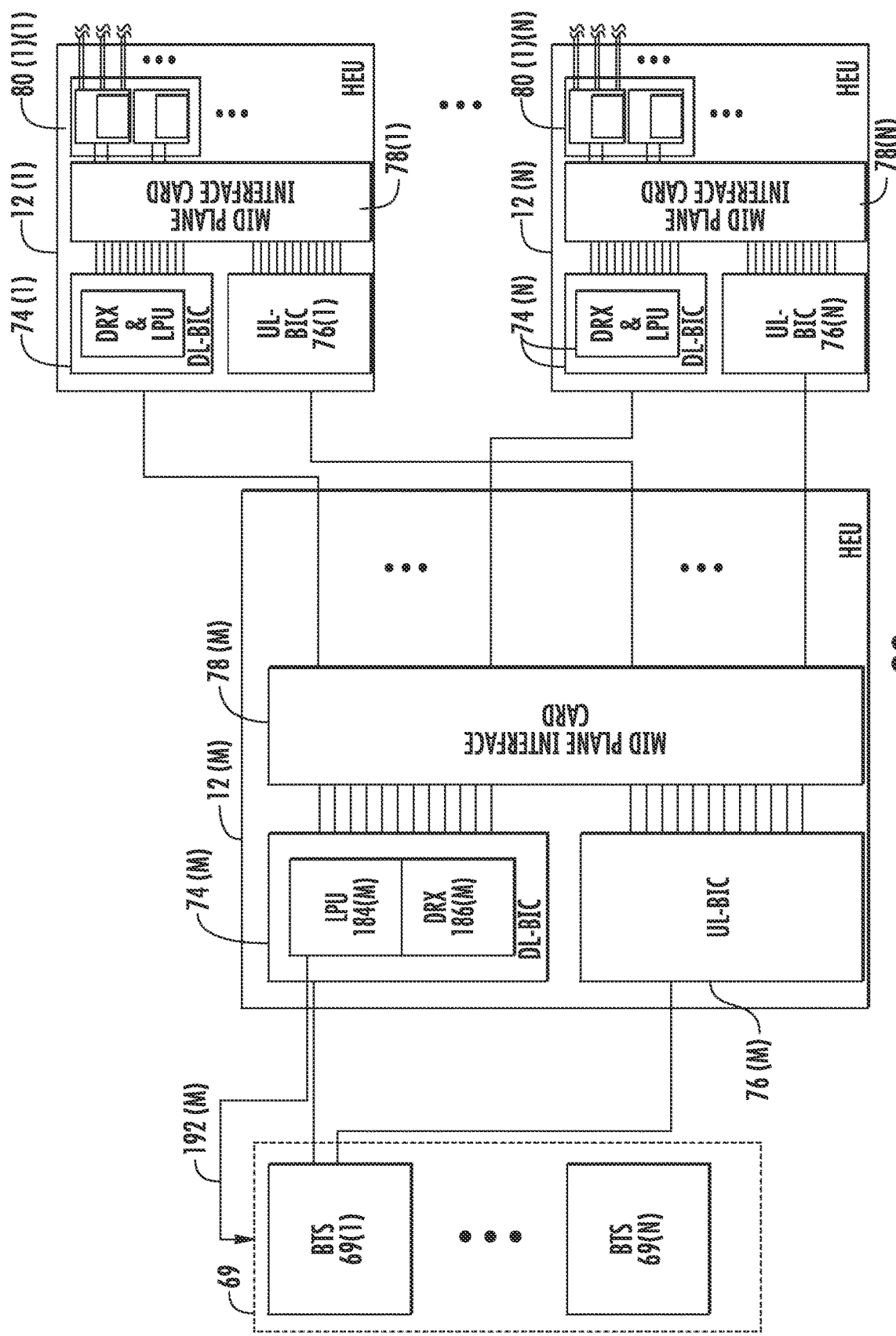
FIG. 20 is a schematic diagram of a master HEU configured to provide location information for client devices communicating with a plurality of slave HEUs communicatively coupled to the master HEU.

If it is desired to support providing location services for more client devices than a single HEU 12 can handle, multiple HEUs 12 can be provided in a master/slave arrangement. In this regard, FIG. 20 is a schematic diagram of a master HEU 12(M) configured to provide location information for client devices communicating with a plurality of slave HEUs 12(1)-12(N) communicatively coupled to the master HEU 12(M). The components in the HEUs 12(M), 12(1)-12(N) have been previously described and are not re-described here. Each slave HEU 12(1)-12(N) can provide location information as previously described above to the master HEU 12(M), and more particularly to a master LPU 184(M), which can in turn provide such location information to the base stations 69(1)-69(N). Location services can be requested over a master communication link 192(M) to the master HEU 12(M), which in turn may pass the location services request to the appropriate slave HEU 12(1)-12(N).

Some base stations support a transmission method using more than one antenna to receive or transmit RF signals along different propagation paths, for example, using antenna diversity or a multiple input/multiple output (MIMO) antenna scheme. In this case, more than one antenna can be used to receive the downlink signal at the head-end unit. The signals are individually transmitted to the head-end unit and then combined with the respective received signals. This method can provide better signal quality and increase reliability.

As previously discussed, the RF signals in the distributed antenna systems disclosed herein can be, but are not required, to be modulated according to the LTE standard. LTE employs OFDM for downlink data transmission and SC-FDMA for uplink transmission and furthermore, uses a MIMO antenna scheme for data transmission. In OFDM, a large number of sub-carrier frequencies are used to carry the data. The sub-carriers are orthogonal to each other so that the cross-talk between the sub-channels is eliminated. Each sub-carrier is independently modulated. Based on the orthogonality, a discrete Fourier transform (DFT) algorithm can be simply implemented on the receiver side and inverse DFT (IDFT) on the transmitter side. Similarly in SC-FDMA, both DFT and IDFT are applied on the transmitter side and also on the receiver side.

LTE users can be separated by the base station 69 in time and frequency domain. A media access controller (MAC) scheduler of a base station 69 is in control of assigning RBs to specific client devices 24 and has knowledge of which RB belongs to which client device 24. For an outside observer, this knowledge is not readily obtainable. However, in order to locate a client device 24 within the proximity of an RAU 14, as previously discussed, it can be sufficient to measure the RB energy from the client device 24 and send the maximum detected values together with the RAU 14 number to the base station. The base station 69 then can take the measurement results and relate it to the MAC scheduling information.

In this regard, FIG. 21 shows a simple example how client devices 24 are separated by time and frequency in LTE. The base station 69 assigns different RBs to different client devices 24. Due to the nature of a distributed antenna system, the base station 69 sees a superposition 310 of signals 312(1)-312(N) received from the individual antennas 32(1)-32(N). The base station 69 uses the scheduling information to demodulate and de-multiplex the received SC-FDMA multiplex. If the IDAS reports from which antenna 32(1)-32(N) RB is received with maximum energy, a client device 24 can be located. Thus, the location retrieval process can be summarized as follows for one embodiment. For each antenna 32 and channel, detect energy for every RB. For each RB, report max value together with antennas 32(1)-32(N) to the base station 69. As the base station 69 knows each client device's 24 allocation in the superposition of signals, a user can be associated with an antenna.

Figure 22:
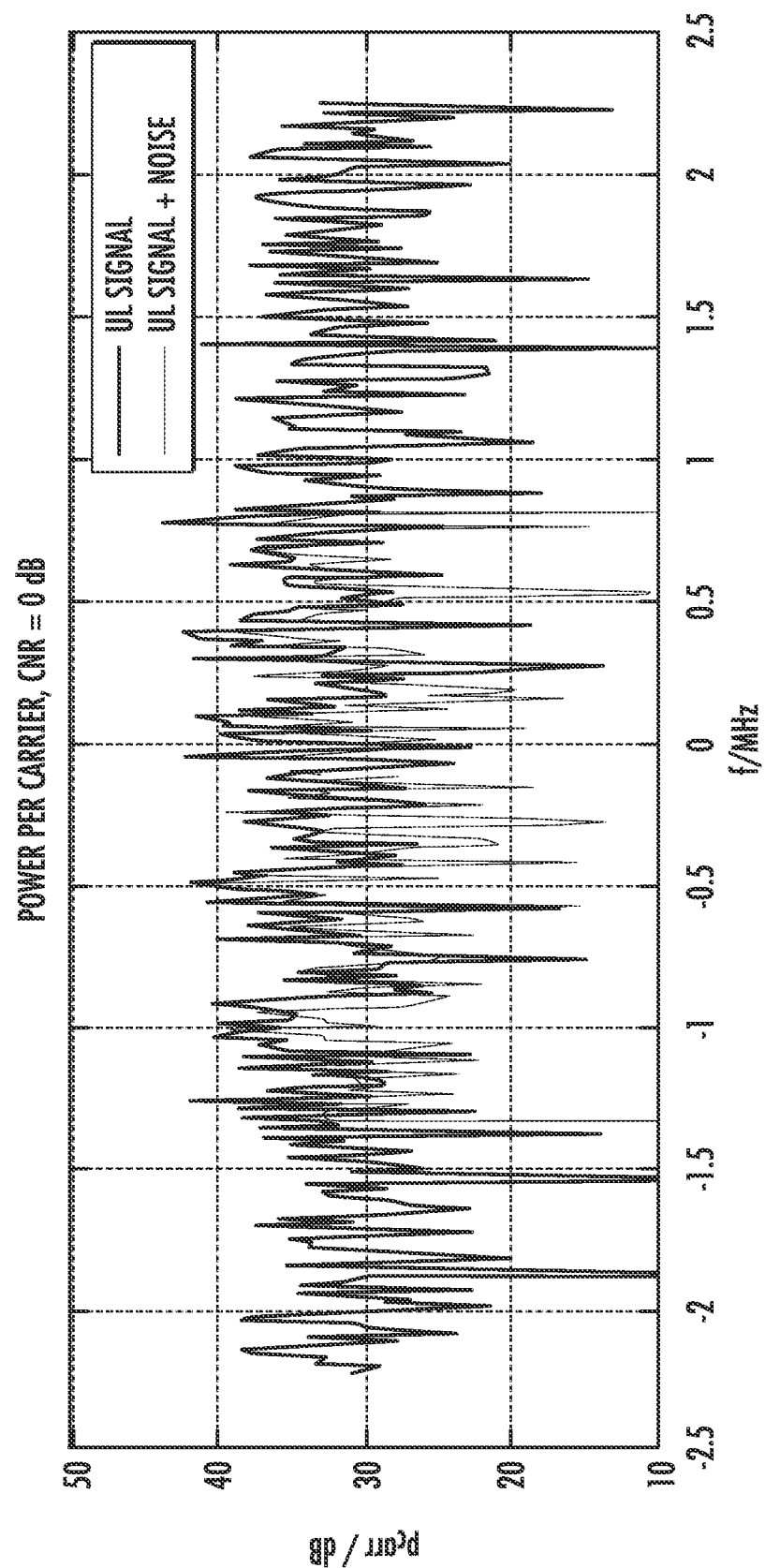
FIG. 22 is a graph illustrating exemplary SC-FDMA spectrum of a 0 dB SC-FDMA signal compared to noise level.

In order to minimize interference to adjacent cells in this embodiment, LTE signals are sent typically close to the minimum required signal level necessary to demodulate the signal at the base station. It has been shown above that carrier to noise ratios can be as low as −3 dB. FIG. 22 shows the spectrum of an SC-FMDA signal that is received with a CNR of 0 dB. Also shown is the spectrum of a noise signal. It can be seen that for this level, the signal is not possible to visually distinguish the signal from the noise signal (i.e., the presence of the uplink signal is hard to detect). It shall also be noted that in contrast to OFDM, an SC-FDMA signal does not have a flat spectrum.

For RB energy detection, at first, the time and frequency synchronized signal is shifted such by one half subcarrier (i.e., 7.5 kHz to remove the one half subcarrier frequency shift that is introduced at the uplink transmitter to avoid a possible DC notch). Then, the cyclic prefix is removed by selecting a window of FFT SIZE samples. The FFT size varies with the LTE channel bandwidth. On the selected samples, the FFT is computed and the squared absolute values of the FFT outputs are computed. These values are proportional to the energy received on one (1) subcarrier for one (1) SC-FDMA symbol. All squared outputs that belong to one (1) RB are now added to give the total RB energy. The addition takes place over twelve (12) adjacent FFT outputs and over six (6) or seven (7) SC-FDMA symbols depending on the LTE mode used. The sounding reference if present needs to be omitted. As the distributed antenna system may not know when the sounding reference symbol is sent, the last SC-FDMA symbol in a subframe shall always be omitted. In order to keep time slots symmetrical, omit the last SC-FDMA symbol in the first time slot of a subframe.

Figure 23:
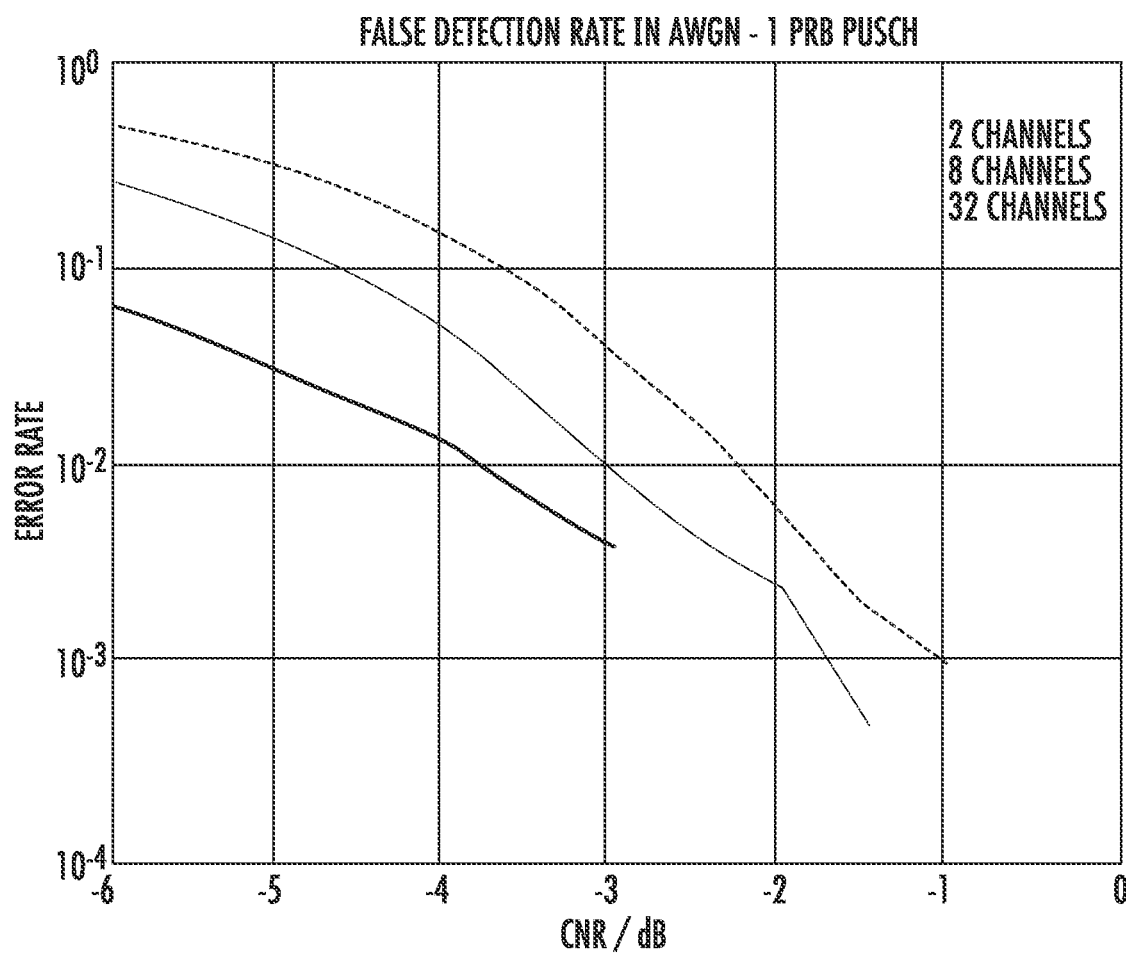
FIG. 23 is a graph illustrating exemplary false detection probability for one client device and one resource block (RB)

The robustness of the algorithm in Additive White Gaussian Noise (AWGN) channels has been analyzed. In this analysis, one client device 24 is added to one RAU 14, the other antennas 32 are receiving white Gaussian noise only for that RB. Each RAU 14 represents a possible communication channel. The client device 24 just sends one (1) RB. Detection is positive if the received RB energy for the channel to which the client device 24 is connected is highest. The results are shown in FIG. 23. It can be seen that if the distributed antenna system has to choose between many channels (e.g., thirty-two (32)), and bases its decision solely on one RB's energy, the probability of a false decision is higher than if the distributed antenna system would have to choose between only two (2) channels. For low carrier-to-noise ratios of −3 dB, the probability of making a wrong decision is four (4) percent in this example, whereas it would be around 0.3 percent if the distributed antenna system would have to decide between just two channels. For higher CNRs of like 0 dB, the probability of a wrong decision is below 0.1 percent (i.e., the highest energy value reported by the IDAS would point to the right RAU with likelihood greater than 99.1 percent).

Figure 24:
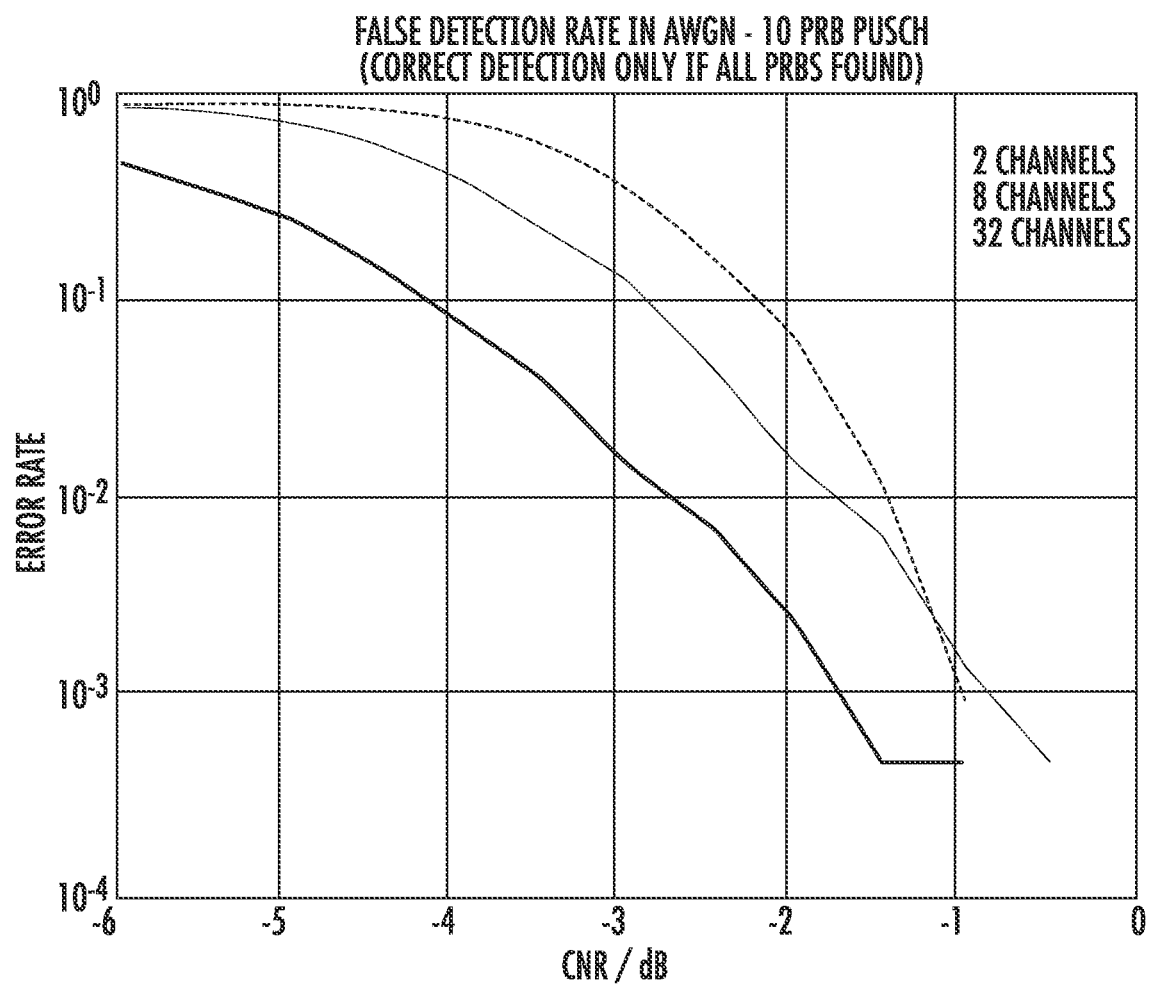
FIG. 24 is a graph illustrating exemplary probability of not having 10 RBs pointing to the same RAU.
Figure 25:
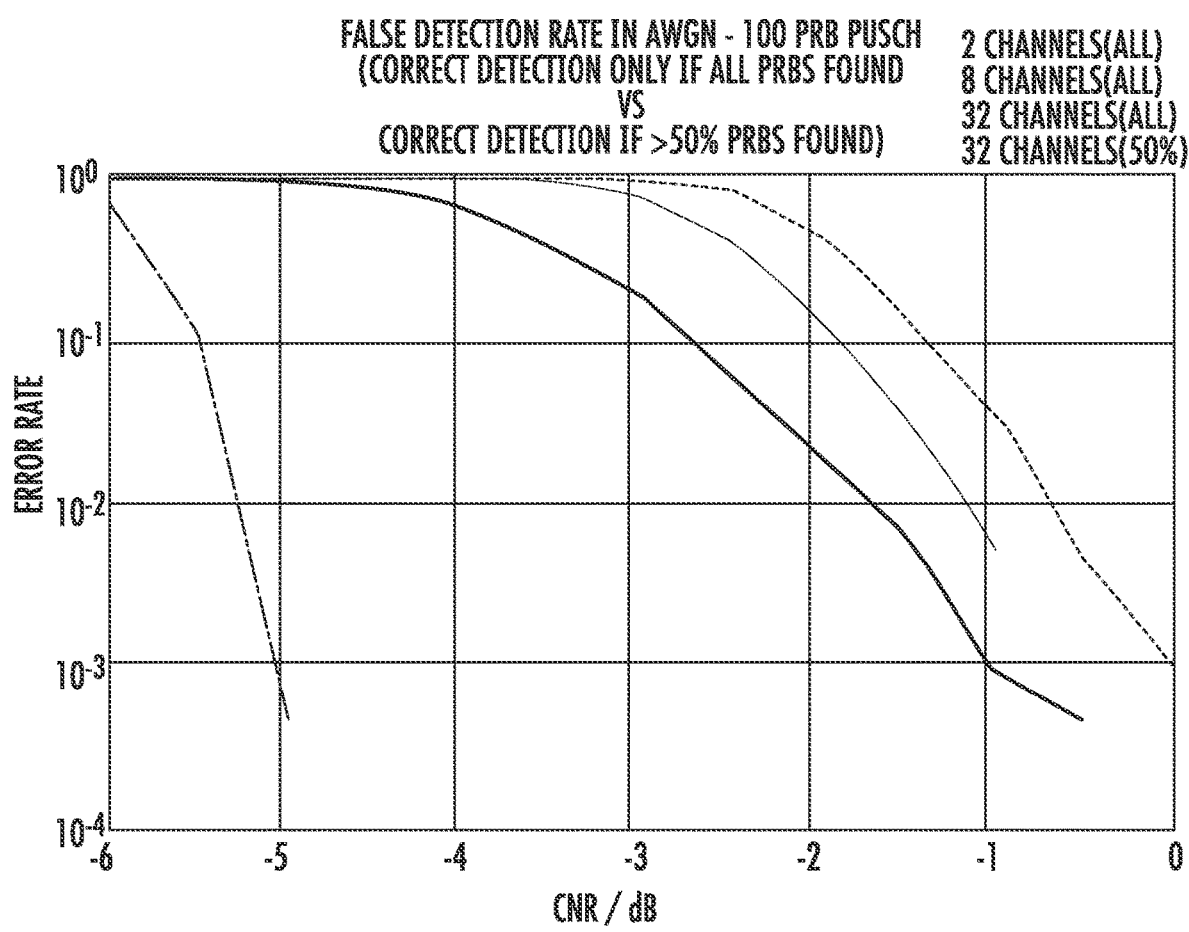
FIG. 25 is a graph illustrating exemplary probability of not having 100 RBs pointing to the same RAU.

The detection probability has been further analyzed. FIGS. 24 and 25 show the probability of a false detection as a function of RAU 14 channels if the location information is rejected if one or more maximum results point to different RAUs 14, in this example. This is done for 10 or 100 RBs, respectively. As more observations are made, the probability for rejected location information increases with the number of observations.

For a CNR of −3 dB and thirty-two (32) RAU 14 channels, the probability of having at least one RB pointing at the wrong channel using the maximum energy criterion is close to 100 percent. An alternative for a base station 69 is to choose the most likely antenna after multiple observations (i.e., select the RAU 14 that is most often reported). FIG. 25 also shows the probability that more than 50 out of 100 observations point to the correct RAU 14 for thirty-two (32) RAU 14 channels. This curve can be seen as an upper bound for making a wrong decision. Using this method, it can be seen from FIG. 25 that an LTE user can be located with a probability of greater than 99.9 percent even if the received CNR is as low as −5 dB and fulfills all requirements on location processing with margin.

Figure 26:
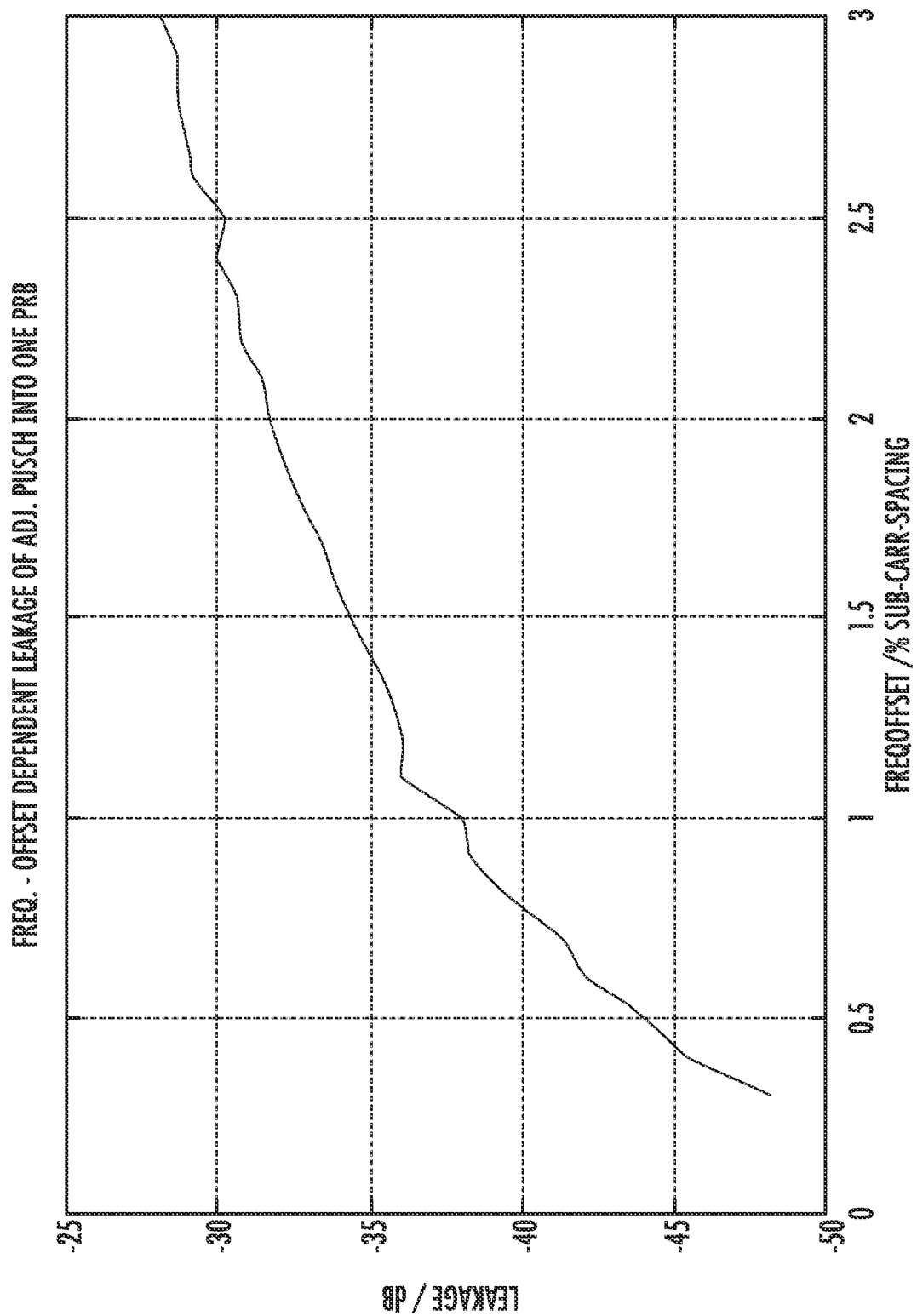
FIG. 26 is a graph illustrating exemplary energy leakage caused by frequency offset.

The impact of frequency offset has been analyzed. Frequency offset destroys the orthogonality of the SC-FDMA signal. In this regard, FIG. 26 shows the energy leakage that is caused by frequency offset. It can be seen that one percent of the subcarrier spacing causes −37 dB leakages (i.e., an adjacent signal on a different RAU that is received at the base station 37 dB stronger than the signal for which the location needs to be determined can cause a wrong decision). One percent subcarrier spacing corresponds to 150 Hz. For three percent, i.e., 450 Hertz (Hz), the leakage already increases to −28 dB. It shall be noted that at a signal frequency of 2 GigaHertz (GHz), 150 Hz frequency offset can be caused by an oscillator inaccuracy of, i.e., 75 parts per billion which is a factor 500 less than the accuracy of an off-the-shelf crystal oscillator. Thus, frequency synchronization is performed. The frequency can be synchronized to the base station's downlink signal through standard techniques that are also used in mobile terminals.

Figure 27:
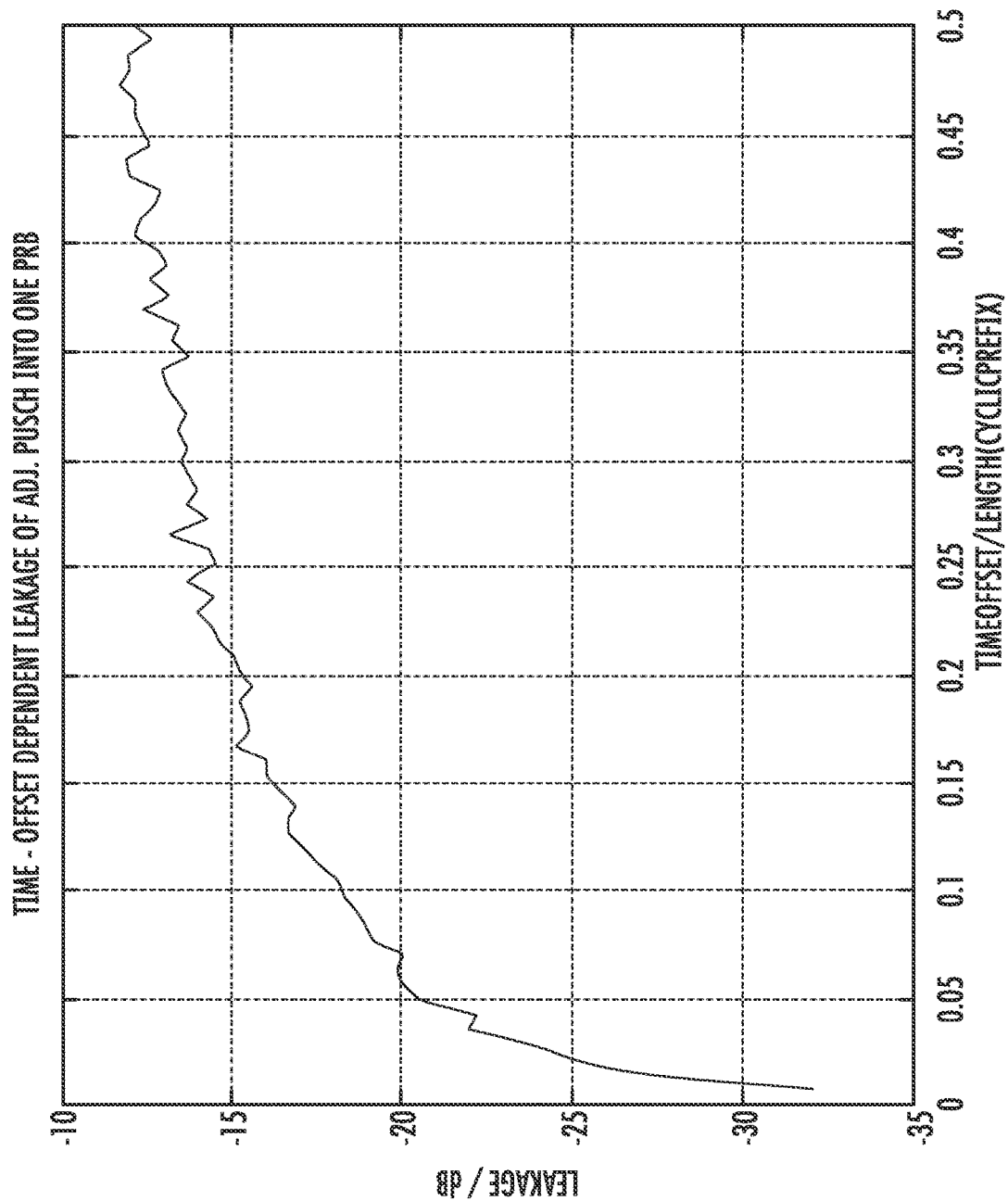
FIG. 27 is a graph illustrating exemplary energy leakage caused by time offset.

Like frequency offset, time offset destroys the orthogonality of the SC-FDMA signal. FIG. 27 shows the energy leakage as a function of time offset relative to the length of the cyclic prefix. A time offset causes intersymbol interference. At a time offset of twenty (20) percent of the cyclic prefix (approximately 1 pec), the leakage already has reached −15 dB. This would mean that a terminal that is received at the base station 15 dB stronger than the terminal whose location needs to be determined can significantly impact the location detection capabilities of the system. Therefore, time synchronization is performed. The symbol timing can be synchronized to the base station's downlink signal through standard techniques that are also used in mobile terminals. The accurate time shall be distributed over a dedicated wire.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The memory controllers, arbiter, master units, and sub-master units described herein may be employed in any circuit, hardware component, IC, or IC chip, as examples. The memory may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Many modifications and other embodiments of the embodiments set forth herein will come to mind to one skilled in the art to which the embodiments pertain having the benefit of the teachings presented in the foregoing descriptions and the associated drawings. These modifications include, but are not limited to, whether a tracking signal is provided, whether downlink and/or uplink BICs are included, whether tracking signal inputs are provided in the same distributed communications unit as downlink base station inputs, the number and type of OICs and RAUs provided in the distributed antenna system, etc. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A method for determining a location of a client device by a wireless communications system comprising a plurality of optical cables and a plurality of remote units distributed throughout an indoor region, each of the remote units being located in a known location for communicating with the client device, comprising:
- selecting one or more specific time slots from downlink signals;
- calculating received signal strength indication (RSSI) values for each of a plurality of resource blocks (RBs) at a specific time slot from uplink signals;
- delivering the RSSI values of the remote units to a location server of a location processing unit (LPU); and
- identifying which of the remote units is closest to a transmitting client device by monitoring the RSSI values, wherein
  - the remote units are distributed among at least four respective tracking zones of a building infrastructure,
  - the remote units are optically coupled to a head-end unit of the wireless communication system,
  - the downlink signals are split at the head-end unit, and
  - location information comprising maximum RSSI values with the respective remote unit locations where those maximum RSSI values have been received are configured to be combined with a prior user allocation to provide a location estimate.

2. The method of claim 1, comprising digitizing the downlink RF signals by at least one analog-to-digital (ADC) converter.

3. The method of claim 2, wherein the uplink RF signals are received from the remote units before being combined together by a combiner at the head-end unit.

4. The method of claim 3, wherein the plurality of remote units is distributed among multiple floors of the building infrastructure.

5. The method of claim 1, comprising converting the uplink RF signals to baseband by at least one transceiver (TRX).

6. The method of claim 5, wherein the uplink RF signals are received from the remote units before being combined together by a combiner at the head-end unit.

7. The method of claim 6, wherein the plurality of remote units is distributed among multiple floors of the building infrastructure.

8. A method for determining a location of a client device by a wireless communications system comprising a plurality of optical cables and a plurality of remote units distributed throughout an indoor region, wherein each of the remote units is located in a known location for communicating with the client device, comprising:
- digitizing uplink signals;
- selecting one or more specific time slots from downlink signals;
- calculating received signal strength indication (RSSI) values for each of a plurality of resource blocks (RBs) at a specific time slot from the uplink signals;
- delivering the RSSI values of the remote units to a location server of a location processing unit (LPU); and
- identifying which of the remote units is closest to a transmitting client device by monitoring the RSSI values, wherein
  - monitoring the RSSI values comprises determining a frequency usage of each remote unit in the LPU,
  - the remote units are distributed among at least four respective tracking zones of a building infrastructure,
  - the remote units are optically coupled to a head-end unit of the wireless communication system, and
  - location information comprising maximum RSSI values with the respective remote unit locations where those maximum RSSI values have been received are configured to be combined with a prior user allocation to provide a location estimate.

9. The method of claim 8, wherein the uplink RF signals are received from the remote units before being combined together at the head-end unit.

10. The method of claim 8, wherein the LPU comprises a plurality of signal monitoring devices that determine the frequency usage of each remote unit.

11. The method of claim 10, wherein the plurality of remote units is distributed among multiple floors of the building infrastructure.

12. The method of claim 8, wherein the LPU comprises a plurality of signal monitoring devices that determine the frequency usage of each remote unit.

13. The method of claim 12, wherein the plurality of remote units is distributed among multiple floors of a building infrastructure.

14. A method for determining a location of a client device by a wireless communications system comprising a plurality of optical cables and a plurality of remote units, comprising:
- receiving optical uplink signals from the plurality of remote units distributed among at least four respective tracking zones in a building infrastructure;
- selecting one or more specific time slots from downlink signals;
- digitizing the uplink signals in at least one analog-to-digital (ADC) converter;
- calculating received signal strength indication (RSSI) values for each of a plurality of resource blocks (RBs) at a specific time slot from the uplink signals;
- delivering the RSSI values of the remote units to a location server of a location processing unit (LPU); and
- identifying which of the remote units is closest to a transmitting client device by monitoring the RSSI values, wherein
  - location information comprising maximum RSSI values with the respective remote unit locations where those maximum RSSI values have been received are configured to be combined with a prior user allocation to provide a location estimate.

15. The method of claim 14, wherein the uplink RF signals are received from the remote units before being combined together at the head-end unit.

16. The method of claim 14, comprising converting the uplink signals to baseband.

* * * * *